United States Patent
Seregin et al.

(10) Patent No.: US 10,887,611 B2
(45) Date of Patent: Jan. 5, 2021

(54) PRUNING FOR ILLUMINATION COMPENSATION MODE

(71) Applicant: QUALCOMM Incorporated, San Diego, CA (US)

(72) Inventors: Vadim Seregin, San Diego, CA (US); Wei-Jung Chien, San Diego, CA (US); Marta Karczewicz, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 16/715,069

(22) Filed: Dec. 16, 2019

(65) Prior Publication Data
US 2020/0213600 A1 Jul. 2, 2020

Related U.S. Application Data

(60) Provisional application No. 62/785,434, filed on Dec. 27, 2018.

(51) Int. Cl.
*H04N 19/186* (2014.01)
*H04N 19/513* (2014.01)
(Continued)

(52) U.S. Cl.
CPC ......... *H04N 19/186* (2014.11); *H04N 19/521* (2014.11)

(58) Field of Classification Search
None
See application file for complete search history.

(56) References Cited

U.S. PATENT DOCUMENTS

2014/0219356 A1* 8/2014 Nishitani ............. H04N 19/513
                                                    375/240.16
2015/0312588 A1* 10/2015 Yamamoto ............. H04N 19/44
                                                    375/240.15
(Continued)

FOREIGN PATENT DOCUMENTS

WO    2016200779 A1    12/2016

OTHER PUBLICATIONS

International Search Report and Written Opinion—PCT/US2019/066961—ISA/EPO—dated Feb. 28, 2020.
(Continued)

*Primary Examiner* — Hung Q Dang
(74) *Attorney, Agent, or Firm* — Polsinelli LLP

(57) ABSTRACT

Systems and techniques for processing video data include a pruning processes for motion vector candidate list construction. An illumination compensation flag of a potential motion information candidate to be added to a motion information candidate list can include motion information associated with a block of video data, where the motion information can include a motion vector and an illumination compensation flag. The motion information can be compared with stored motion information in the motion information candidate list, where the stored motion information can include at least one stored motion vector and associated stored illumination compensation flag. When the motion vector matches the stored motion vector, the pruning process can include not adding the motion vector to the motion information candidate list, and updating the stored illumination compensation flag based on a value of the illumination compensation flag and a value of the stored illumination compensation flag.

30 Claims, 12 Drawing Sheets

(51) Int. Cl.
  *H04N 19/70*   (2014.01)
  *H04N 19/52*   (2014.01)

(56) References Cited

U.S. PATENT DOCUMENTS

| | | | |
|---|---|---|---|
| 2017/0046563 A1* | 2/2017 | Kim | G06K 9/00275 |
| 2017/0134750 A1* | 5/2017 | Ikai | H04N 19/159 |
| 2018/0098086 A1* | 4/2018 | Chuang | H04N 19/126 |
| 2019/0268611 A1* | 8/2019 | Chen | H04N 19/196 |
| 2019/0297325 A1* | 9/2019 | Lim | H04N 19/513 |
| 2020/0014919 A1* | 1/2020 | Zhao | H04N 19/105 |

OTHER PUBLICATIONS

Liu H., et al., "Local Illumination Compensation", 52. VCEG Meeting, Jun. 19, 2015-Jun. 26, 2015, Warsaw, (Video Coding Experts Group of ITU-T SG.16), No, VCEG-AZ06_r1, Jun. 25, 2015 (Jun. 25, 2015), XP030003884, 4 pages.

* cited by examiner

Reference block

Current CU

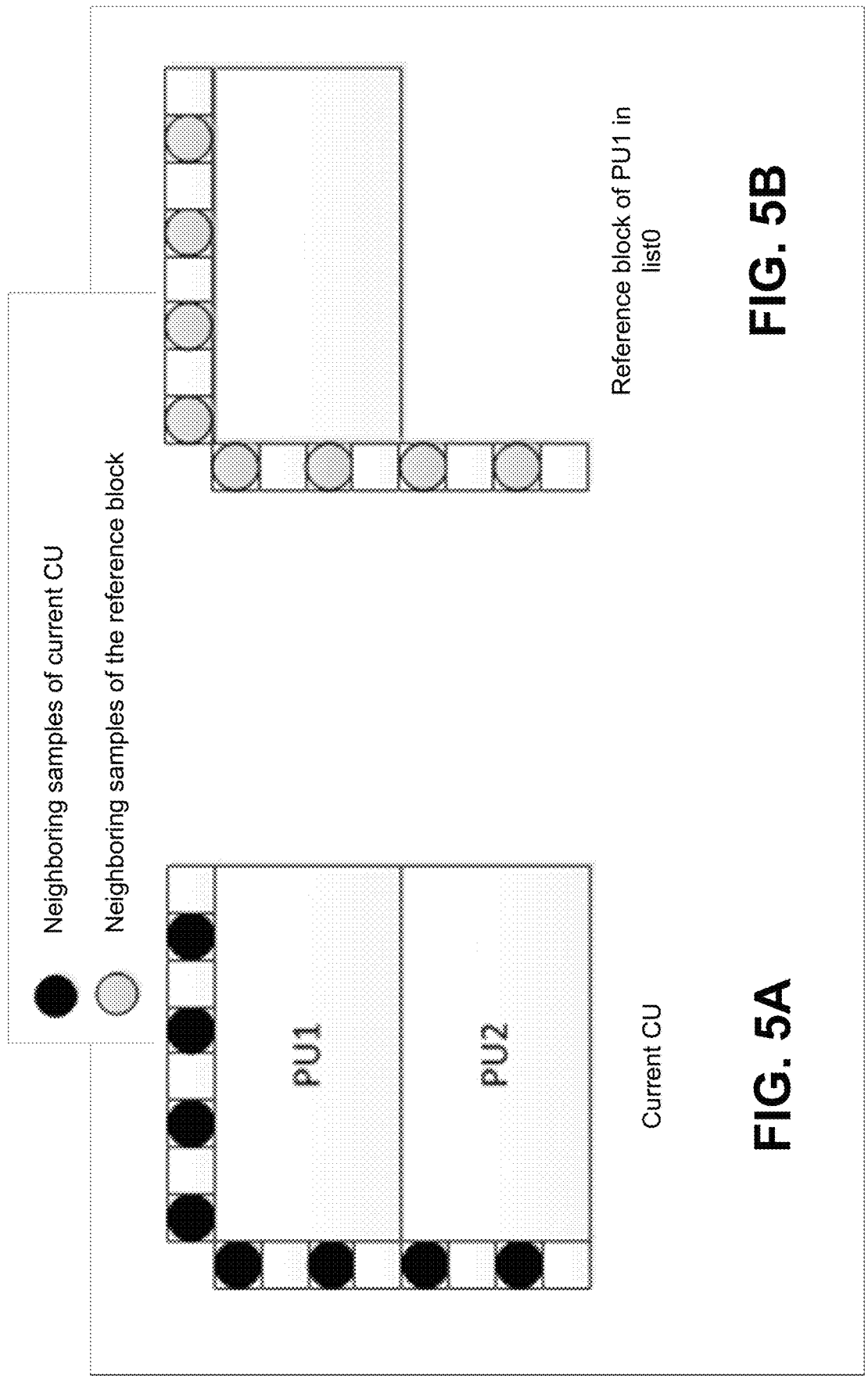

900

OBTAIN AN ENCODED VIDEO BITSTREAM INCLUDING VIDEO DATA
902

DETERMINE MOTION INFORMATION ASSOCIATED WITH A BLOCK OF THE VIDEO DATA, THE MOTION INFORMATION COMPRISING AT LEAST A MOTION VECTOR AND AN ILLUMINATION COMPENSATION FLAG
904

COMPARE THE MOTION INFORMATION WITH STORED MOTION INFORMATION IN A MOTION INFORMATION CANDIDATE LIST, THE STORED MOTION INFORMATION COMPRISING A STORED MOTION VECTOR AND A STORED ILLUMINATION COMPENSATION FLAG
906

DETERMINE THAT THE MOTION VECTOR MATCHES THE STORED MOTION VECTOR
908

DETERMINE WHETHER TO UPDATE THE STORED ILLUMINATION COMPENSATION FLAG BASED ON A VALUE OF THE ILLUMINATION COMPENSATION FLAG AND A VALUE OF THE STORED ILLUMINATION COMPENSATION FLAG
910

FIG. 9

PRUNING FOR ILLUMINATION COMPENSATION MODE

CROSS-REFERENCE TO RELATED APPLICATIONS

This application claims the benefit of U.S. Provisional Application No. 62/785,434, filed Dec. 27, 2018, which is hereby incorporated by reference, in its entirety and for all purposes.

FIELD

This application is related to video coding and compression. More specifically, this application relates to systems and methods of performing improved local illumination compensation.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), MPEG-2 Part 2 coding (MPEG stands for moving picture experts group), VP9, Alliance of Open Media (AOMedia) Video 1 (AV1), Essential Video Coding (EVC), or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

Illumination compensation can be used to efficiently compensate variations in illumination between one or more pictures. A motion information candidate list can store motion information including motion vectors and illumination compensation information for motion prediction of one or more blocks of a picture. In some examples, constructing the motion information candidate list can include a pruning process for avoiding redundant information from being stored in the motion information candidate list. In some implementations, techniques and systems are described herein for improved pruning processes which can be used in constructing the motion information candidate list.

In some implementations, the illumination compensation information stored in the motion information candidate list can include an illumination compensation flag. Illumination compensation for a block of a picture may be applied based on the value of the stored illumination compensation flag. In some examples, the pruning processes described herein can take into account an illumination compensation flag of a potential motion information candidate to be added to the motion information candidate list. The potential motion information candidate can include motion information associated with the block. The motion information of the potential motion information candidate includes at least a motion vector and an illumination compensation flag. In some examples, the motion information can be compared with stored motion information in the motion information candidate list. The stored motion information includes at least a stored motion vector and an associated stored illumination compensation flag. When the motion vector matches the stored motion vector, the motion vector may not be added to the motion information candidate list, and the stored illumination compensation flag can be updated based on a value of the illumination compensation flag and a value of the stored illumination compensation flag. For example, the stored illumination flag can be updated to a first value if the value of the illumination compensation flag is the first value and the value of the stored illumination compensation flag is a second value. Otherwise, the stored illumination flag may not be updated. In some examples, determining whether to update the stored illumination compensation flag in this manner can lead to coding efficiencies while avoiding complex comparison techniques in the pruning process.

According to at least one example, a method of decoding video data is provided. The method includes obtaining an encoded video bitstream including video data. The method further includes determining motion information associated with a block of the video data, the motion information comprising at least a motion vector and an illumination compensation flag. The method further includes comparing the motion information with stored motion information in a motion information candidate list, the stored motion information comprising a stored motion vector and a stored illumination compensation flag. The method further includes determining that the motion vector matches the stored motion vector. The method further includes determining whether to update the stored illumination compensation flag based on a value of the illumination compensation flag and a value of the stored illumination compensation flag.

In another example, an apparatus for decoding video data is provided. The apparatus includes a memory and a processor implemented in circuitry. The processor is configured to and can obtain an encoded video bitstream including video data. The processor is further configured to and can determine motion information associated with a block of the video data, the motion information comprising at least a motion vector and an illumination compensation flag. The processor is further configured to and can compare the motion information with stored motion information in a motion information candidate list, the stored motion information comprising a stored motion vector and a stored illumination compensation flag. The processor is further configured to and can determine that the motion vector matches the stored motion vector. The processor is further configured to and can determine whether to update the stored illumination compensation flag based on a value of the illumination compensation flag and a value of the stored illumination compensation flag.

In another example, a non-transitory computer-readable medium is provided that has stored thereon instructions that, when executed by one or more processors, cause the one or more processors to: obtain an encoded video bitstream including video data; determine motion information associated with a block of the video data, the motion information comprising at least a motion vector and an illumination compensation flag; compare the motion information with stored motion information in a motion information candidate list, the stored motion information comprising a stored motion vector and a stored illumination compensation flag; determine that the motion vector matches the stored motion vector; and determine whether to update the stored illumination compensation flag based on a value of the illumination compensation flag and a value of the stored illumination compensation flag.

In another example, an apparatus for decoding video data is provided. The apparatus includes means for obtaining an encoded video bitstream including video data. The apparatus further includes means for determining motion information associated with a block of the video data, the motion information comprising at least a motion vector and an illumination compensation flag. The apparatus further includes means for comparing the motion information with stored motion information in a motion information candidate list, the stored motion information comprising a stored motion vector and a stored illumination compensation flag. The apparatus further includes means for determining that the motion vector matches the stored motion vector. The apparatus further includes means for determining whether to update the stored illumination compensation flag based on a value of the illumination compensation flag and a value of the stored illumination compensation flag.

According to at least one example, a method of encoding video data is provided. The method includes obtaining a current block of a picture of video data. The method further includes determining motion information associated with a block of the video data, the motion information comprising at least a motion vector and an illumination compensation flag. The method further includes comparing the motion information with stored motion information in a motion information candidate list, the stored motion information comprising a stored motion vector and a stored illumination compensation flag. The method further includes determining that the motion vector matches the stored motion vector. The method further includes determining whether to update the stored illumination compensation flag based on a value of the illumination compensation flag and a value of the stored illumination compensation flag. The method further includes generating an encoded video bitstream including at least the stored motion information.

In another example, an apparatus for encoding video data is provided. The apparatus includes a memory and a processor implemented in circuitry. The processor is configured to and can obtain a current block of a picture of video data. The processor is further configured to and can determine motion information associated with the block of the video data, the motion information comprising at least a motion vector and an illumination compensation flag. The processor is further configured to and can compare the motion information with a stored motion information in a motion information candidate list, the stored motion information comprising a stored motion vector and a stored illumination compensation flag. The processor is further configured to and can determine that the motion vector matches the stored motion vector. The processor is further configured to and can determine whether to update the stored illumination compensation flag based on a value of the illumination compensation flag and a value of the stored illumination compensation flag. The processor is further configured to and can generate an encoded video bitstream including at least the stored motion information.

In another example, a non-transitory computer-readable medium is provided that has stored thereon instructions that, when executed by one or more processors, cause the one or more processors to: obtain an encoded video bitstream including video data; determine motion information associated with a block of the video data, the motion information comprising at least a motion vector and an illumination compensation flag; compare the motion information with stored motion information in a motion information candidate list, the stored motion information comprising a stored motion vector and a stored illumination compensation flag; determine that the motion vector matches the stored motion vector; and determine whether to update the stored illumination compensation flag based on a value of the illumination compensation flag and a value of the stored illumination compensation flag.

In another example, an apparatus for encoding video data is provided. The apparatus includes means for obtaining a current block of a picture of video data. The apparatus further includes means for determining motion information associated with a block of the video data, the motion information comprising at least a motion vector and an illumination compensation flag. The apparatus further includes means for comparing the motion information with stored motion information in a motion information candidate list, the stored motion information comprising a stored motion vector and a stored illumination compensation flag. The apparatus further includes means for determining that the motion vector matches the stored motion vector. The apparatus further includes means for determining whether to update the stored illumination compensation flag based on a value of the illumination compensation flag and a value of the stored illumination compensation flag. The apparatus further includes means for generating an encoded video bitstream including at least the stored motion information.

Some aspects of the methods, apparatuses, and computer-readable media for decoding video data described above further include updating the stored illumination flag to a first value if the value of the illumination compensation flag is the first value and the value of the stored illumination compensation flag is a second value.

In some aspects of the methods, apparatuses, and computer-readable media for decoding video data described above, the first value is a true value and the second value is a false value.

In some aspects of the methods, apparatuses, and computer-readable media for decoding video data described above, the first value is a false value and the second value is a true value.

In some aspects of the methods, apparatuses, and computer-readable media for decoding video data described above, the stored illumination flag is not updated if the value of the illumination compensation flag is a first value and the value of the stored illumination compensation flag is the first value.

In some aspects of the methods, apparatuses, and computer-readable media for decoding video data described above, the first value is a true value.

In some aspects of the methods, apparatuses, and computer-readable media for decoding video data described above, the first value is a false value.

Some aspects of the methods, apparatuses, and computer-readable media for decoding video data described above further include determining whether to apply illumination compensation for the block based on the value of the stored illumination compensation flag, wherein illumination compensation is to be applied if the value of the stored illumination compensation flag is a true value and illumination compensation is not to be applied if the value of the stored illumination compensation flag is a false value.

In some aspects of the methods, apparatuses, and computer-readable media for decoding video data described above, applying illumination compensation for the block comprises: deriving one or more illumination compensation parameters for the block using one or more neighboring blocks of block and one or more neighboring blocks of a reference block used for inter-prediction of the block.

In some aspects of the methods, apparatuses, and computer-readable media for decoding video data described above, the one or more neighboring blocks of the block include one or more of a top neighboring block or a left neighboring block of the block, and wherein the one or more neighboring blocks of the reference block include one or more of a top neighboring block or a left neighboring block of the reference block.

Some aspects of the methods, apparatuses, and computer-readable media for decoding video data described above further include applying illumination compensation for the block based on the value of the stored illumination compensation flag being a true value; and reconstructing a sample of the block based on the illumination compensation applied to the block.

In some aspects of the methods, apparatuses, and computer-readable media for decoding video data described above, reconstructing the sample of the block further comprises applying a residual value.

In some aspects of the methods, apparatuses, and computer-readable media for encoding video data described above, updating the stored illumination flag to a first value if the value of the illumination compensation flag is the first value and the value of the stored illumination compensation flag is a second value.

Some aspects of the methods, apparatuses, and computer-readable media for encoding video data described above further include determining a prediction value for the stored illumination compensation flag; comparing the prediction value with the value of the illumination compensation flag; generating a comparison flag based on the comparison, wherein the comparison flag is set to a first value if prediction value matches the value of the illumination compensation flag or a second value if prediction value does not match the value of the illumination compensation flag; and generating the encoded video bitstream based on the comparison flag.

In some aspects of the methods, apparatuses, and computer-readable media for encoding video data described above, generating the encoded video bitstream based on the comparison flag comprises applying a compression algorithm on the comparison flag.

In some aspects of the methods, apparatuses, and computer-readable media for encoding video data described above, the prediction value for the stored illumination compensation flag is based on one or more illumination compensation flags associated with corresponding one or more neighboring blocks of the block.

Some aspects of the methods, apparatuses, and computer-readable media described above further comprise a mobile device with a camera for capturing one or more pictures.

Some aspects of the methods, apparatuses, and computer-readable media described above further comprise a display for displaying one or more pictures.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 5A is a conceptual diagram illustrating an example of neighboring samples of a current coding unit used for derivation of illumination compensation (IC) parameters for the current coding unit, in accordance with some examples;

FIG. 5B is a conceptual diagram illustrating an example of neighboring samples of a reference block used for derivation of IC parameters for a current coding unit, in accordance with some examples;

FIG. 9 is a flowchart illustrating an example of a process of decoding video data, including constructing a motion information candidate list using example pruning techniques, in accordance with some embodiments;

DETAILED DESCRIPTION

Figure 1:
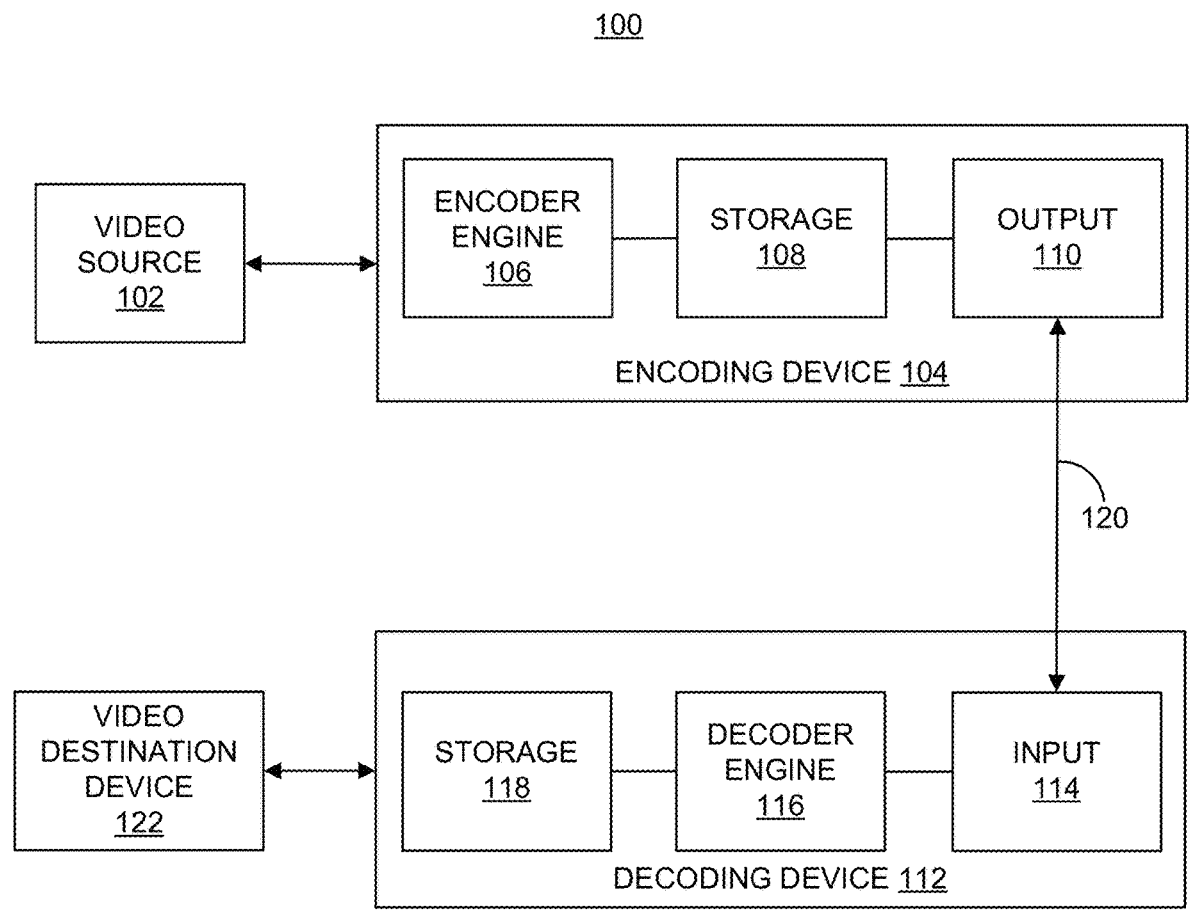
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill. Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

In some examples, one or more systems and methods of processing video data are directed to deriving or estimating illumination compensation (IC) parameters in block based video coding. In some instances, a video encoder and/or a video decoder can perform local illumination compensation (LIC) (or illumination compensation) to efficiently code variations in illumination (e.g., brightness) between one or more pictures. The video encoder and/or the video decoder can determine one or more IC parameters (e.g., an offset, one or more scaling factors, a shift number, or other suitable IC parameters) for the coding block or coding unit being encoded or decoded. The IC parameters can be determined based on samples of multiple reference blocks, samples of one or more neighboring blocks of the current block, and/or other information. The video decoder can utilize the IC parameters and/or other data to construct predictive data for decoding the current block.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1

Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore new coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9, Alliance of Open Media (AOMedia) Video 1 (AV1), and Essential Video Coding (EVC) are other video coding standards for which the techniques described herein can be applied.

Many embodiments described herein can be performed using video codecs such as VTM, VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. In other instances, a picture may be monochrome and may only include an array of luma samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
| --- | --- |
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID). Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS. SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible piano-stereoscopic 3DTV video format, where the SEI message is carried for every frame of the video, handling of a recovery point SEI message, use of pan-scan scan rectangle SEI message in DVB3, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU. In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 11. An example of specific details of the decoding device 112 is described below with reference to FIG. 12.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID==0) and one or more enhancement layers (with layer IDs==1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList1 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RelPiclist0 or RefPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into sub-blocks, in which case each sub-block can have a different motion vector in each direction. In some examples, there are four different ways to get sub-blocks from an 8×8 MB partition, including: one 8×8 sub-block; two 8×4 sub-blocks; two 4×8 sub-blocks; and four 4×4 sub-blocks. Each sub-block can have a different motion vector in each direction. Therefore, a motion vector is present in a level equal to higher than sub-block.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

As noted above, in HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU.

When the CU is inter-coded, one set of motion information is present for each PU. In addition, each PU is coded with a unique inter-prediction mode to derive the set of motion information.

For motion prediction in HEVC, there are two interprediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder and/or a decoder. In some instances, for single direction inter-prediction of a PU, the encoder and/or decoder can generate a single AMVP candidate list. In some instances, for bi-directional prediction of a PU, the encoder and/or decoder can generate two AMVP candidate lists, one using motion data of spatial and temporal neighboring PUs from the forward prediction direction and one using motion data of spatial and temporal neighboring PUs from the backward prediction direction.

Figure 2B:
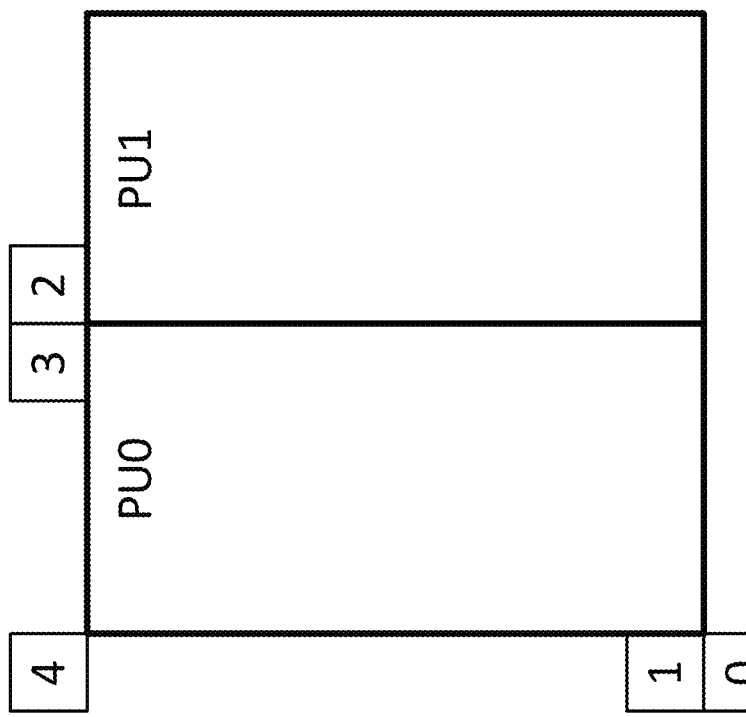
FIG. 2B is a conceptual diagram illustrating example spatial neighboring motion vector candidates for an advanced motion vector prediction (AMVP) mode, in accordance with some examples.
Figure 2A:
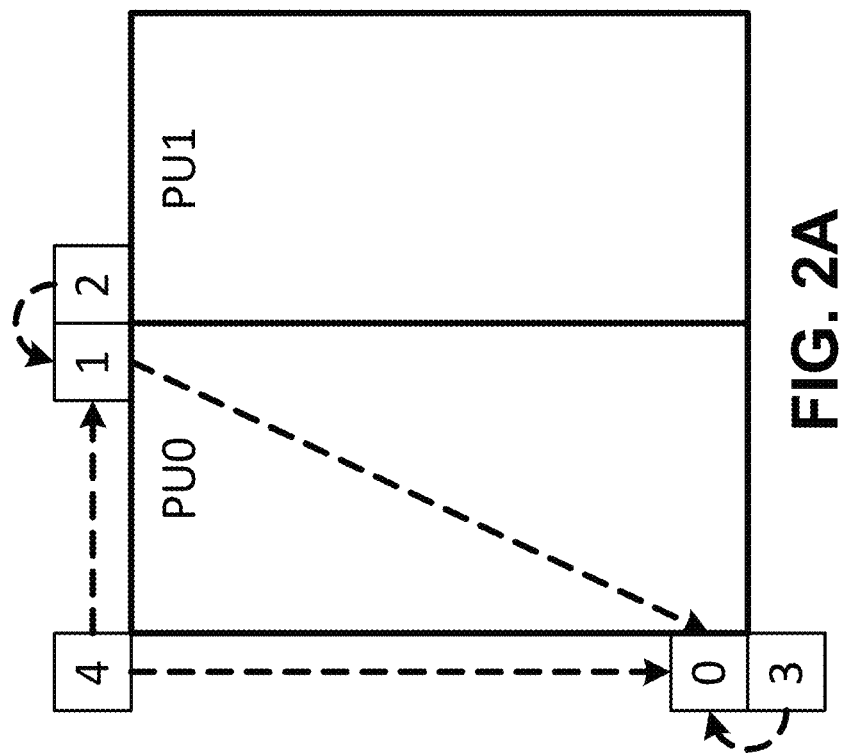
FIG. 2A is a conceptual diagram illustrating example spatial neighboring motion vector candidates for a merge mode, in accordance with some examples.

The candidates for both modes can be derived from spatial and/or temporal neighboring blocks. For example, FIG. 2A and FIG. 2B include conceptual diagrams illustrating spatial neighboring candidates in HEVC. FIG. 2A illustrates spatial neighboring motion vector (MV) candidates for merge mode. FIG. 2B illustrates spatial neighboring motion vector (MV) candidates for AMVP mode. Spatial MV candidates are derived from the neighboring blocks for a specific PU (PU0), although the methods generating the candidates from the blocks differ for merge and AMVP modes.

In merge mode, the encoder and/or decoder can form a merging candidate list by considering merging candidates from various motion data positions. For example, as shown in FIG. 2A, up to four spatial MV candidates can be derived with respect spatially neighboring motion data positions shown with numbers 0-4 in FIG. 2A. The MV candidates can be ordered in the merging candidate list in the order shown by the numbers 0-4. For example, the positions and order can include: left position (0), above position (1), above right position (2), below left position (3), and above left position (4).

In AVMP mode shown in FIG. 2B, the neighboring blocks are divided into two groups: left group including the blocks 0 and 1, and above group including the blocks 2, 3, and 4. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 3A:
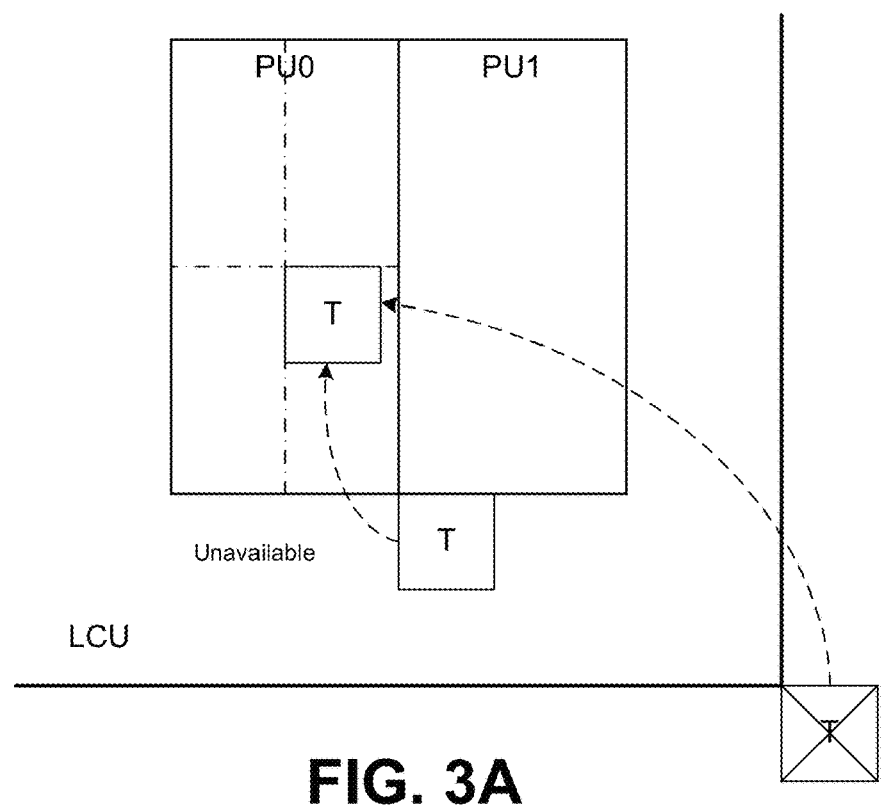
FIG. 3A is a conceptual diagram illustrating an example temporal motion vector predictor (TMVP) candidate, in accordance with some examples.
Figure 3B:
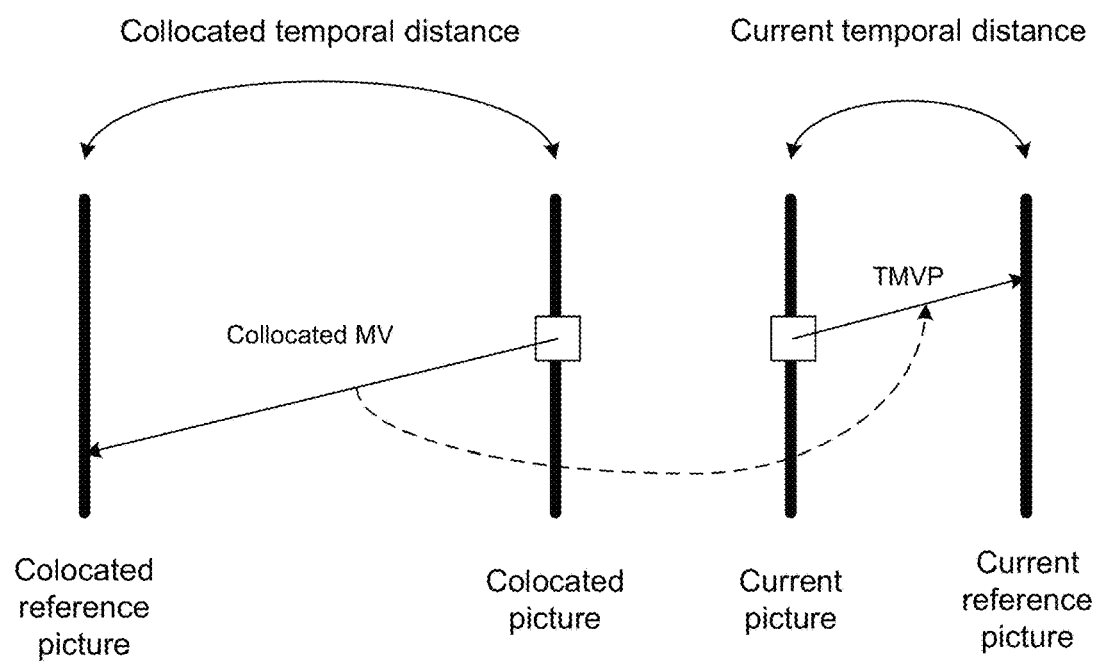
FIG. 3B is a conceptual diagram illustrating an example of motion vector scaling, in accordance with some examples.

FIG. 3A and FIG. 3B include conceptual diagrams illustrating temporal motion vector prediction in HEVC. A temporal motion vector predictor (TMVP) candidate, if enabled and available, is added into a MV candidate list after spatial motion vector candidates. The process of motion vector derivation for a TMVP candidate is the same for both merge and AMVP modes. In some instances, however, the target reference index for the TMVP candidate in the merge mode can be set to zero or can be derived from that of the neighboring blocks.

The primary block location for TMVP candidate derivation is the bottom right block outside of the collocated PU, as shown in FIG. 3A as a block "T", to compensate for the bias to the above and left blocks used to generate spatial neighboring candidates. However, if that block is located outside of the current CTB (or LCU) row or motion information is not available, the block is substituted with a center block of the PU. A motion vector for a TMVP candidate is derived from the co-located PU of the co-located picture, indicated in the slice level. Similar to temporal direct mode in AVC, a motion vector of the TMVP candidate may be subject to motion vector scaling, which is performed to compensate for distance differences.

Other aspects of motion prediction are covered in the HEVC standard. For example, several other aspects of merge and AMVP modes are covered. One aspect includes motion vector scaling. With respect to motion vector scaling, it can be assumed that the value of motion vectors is proportional to the distance of pictures in the presentation time. A motion vector associates two pictures—the reference picture and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And, the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Another aspect of motion prediction includes artificial motion vector candidate generation. For example, if a motion vector candidate list is not complete, artificial motion vector candidates are generated and inserted at the end of the list until all candidates are obtained. In merge mode, there are two types of artificial MV candidates: combined candidate derived only for B-slices; and zero candidates used only for AMVP if the first type does not provide enough artificial candidates. For each pair of candidates that are already in the candidate list and that have necessary motion information, bi-directional combined motion vector candidates are derived by a combination of the motion vector of the first candidate referring to a picture in the list 0 and the motion vector of a second candidate referring to a picture in the list 1.

There are various related motion-prediction technologies. One prediction technology is local illumination compensation (LIC) or luminance compensation. Illumination compensation has been proposed for HEVC. For example, in JCTVC-C041, Partition Based Illumination Compensation (PBIC) was proposed. Different from weighted prediction (WP), which enables and/or disables WP, and signals WP parameters at the slice level (as described below), PBIC enables and/or disables illumination compensation (IC) and signals IC parameters at the prediction unit (PU) level to handle local illumination variation. In JVET-B0023, the block-based LIC is extended to the CU, similar to PU in HEVC, CU becomes the basic unit which carries the motion information in the QTBT structure.

Similar to Weighted Prediction (WP), which is described in more detail below, a scaling factor (also denoted by a) and an offset (also denoted by b) is used in IC, and the shift number is fixed to be 6. An IC flag is coded for each PU to indicate whether IC applies for current PU or not. If IC applies for the PU, a set of IC parameters (e.g., a and b) are signaled to the decoder and is used for motion compensation. In some examples, to save bits spent on IC parameters, the chroma component shares the scaling factors with luma component and a fixed offset 128 is used.

In 3D-HEVC, IC is enabled for inter-view prediction. Different from WP and PBIC, which signals IC parameters explicitly, it derives IC parameters based on neighboring samples of current CU and neighboring samples of reference block. IC applies to 2N×2N partition mode only. For AMVP mode, one IC flag is signaled for each CU that is predicted from an inter-view reference picture. For merge mode, to save bits, an IC flag is signaled only when the merge index of the PU is not equal to 0. In some cases, IC does not apply to CU that is only predicted from temporal reference pictures.

With respect to derivation of IC parameters, the linear IC model used in inter-view prediction is shown in Equation (1):

$$p(i,j)=a*r(i+dv_x,j+dv_y)+b, \text{ where}(i,j) \in PU_c \quad \text{Equation (1)}$$

Here, $PU_U$ is the current PU, (i,j) is the coordinate of pixels in $PU_c$, $(dv_x, dv_y)$ is the disparity vector of $PU_c$. p(i,j) is the prediction of $PU_c$, r is the PU's reference picture from the neighboring view, and a and b are parameters of the linear IC model.

Figure 4B:
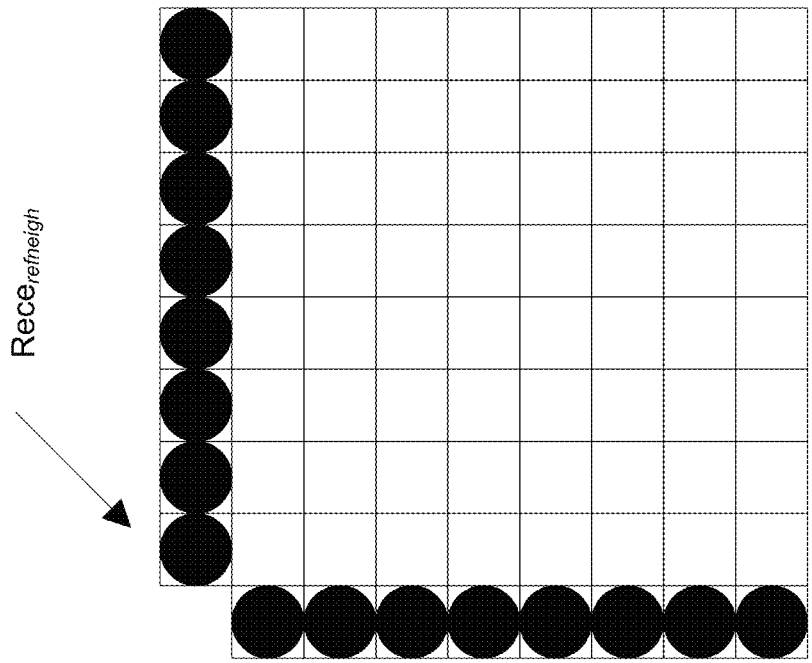
FIG. 4B is a conceptual diagram illustrating an example of neighboring samples of a reference block used for estimating IC parameters for a current coding unit, in accordance with some examples.
Figure 4A:
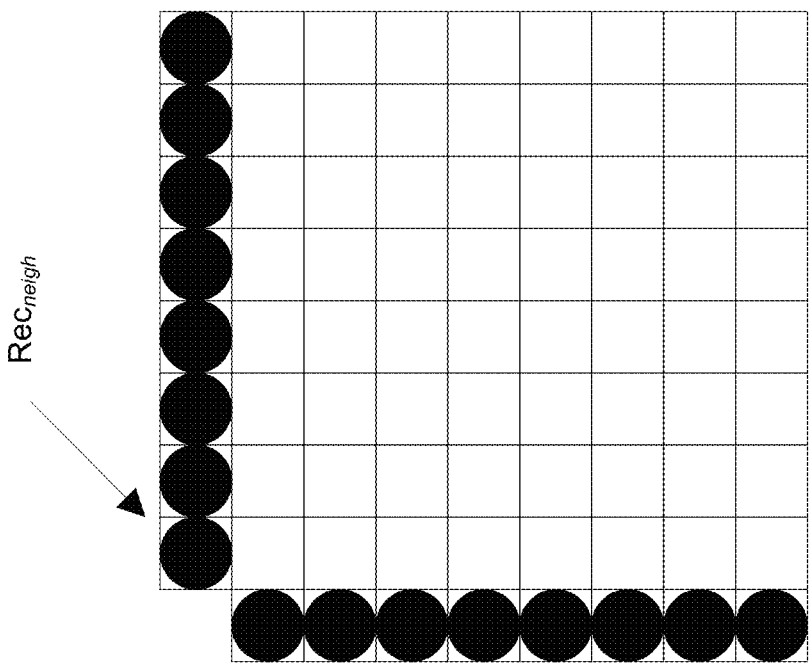
FIG. 4A is a conceptual diagram illustrating an example of neighboring samples of a current coding unit used for estimating illumination compensation (IC) parameters for the current coding unit, in accordance with some examples.

To estimate parameter a and b for a PU, two sets of pixels, as shown in FIG. 4A and FIG. 4B are used. The first set of pixels are shown in FIG. 4A and include available reconstructed neighboring pixels in a left column and an above row of the current CU (the CU that contains the current PU). The second set of pixels are shown in FIG. 4B and include corresponding neighboring pixels of the current CU's reference block. The reference block of the current CU is found by using the current PU's disparity vector.

Let $Rec_{neig}$ and $Rec_{refneig}$ denote used neighboring pixel set of the current CU and its reference block, respectively, and let 2N denote the pixel number in $Rec_{neig}$ and $Rec_{refneig}$. Then, a and b can be calculated as:

Equation (2)

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2}$$

Equation (3)

$$b = \frac{\sum_{i=0}^{2N-1} Rec_{neig}(i) - a \cdot \sum_{i=0}^{2N-1} Rec_{refneig}(i)}{2N}$$

In some cases, only a is used in the linear model and b is always set equal to 0. In some cases, only b is used and a is always set equal to 1.

In HEVC, Weighted Prediction (WP) is supported, in which case a scaling factor (denoted by a), a shift number (denoted by s) and an offset (denoted by b) is used in the motion compensation. Suppose the pixel value in position (x, y) of the reference picture is p(x, y), then p'(x, y)=((a*p(x, y)+(1<<(s−1)))>>s)+b instead of p(x, y) is used as the prediction value in motion compensation.

When WP is enabled, for each reference picture of current slice, a flag is signaled to indicate whether WP applies for the reference picture or not. If WP applies for one reference picture, a set of WP parameters (i.e., a, s and b) is sent to the decoder and is used for motion compensation from the reference picture. In some examples, to flexibly turn on/off WP for luma and chroma component, WP flag and WP parameters are separately signaled for luma and chroma component. In WP, one same set of WP parameters is used for all pixels in one reference picture.

In JEM, a local illumination compensation (LIC) method was proposed. A description of LIC in JEM can be found in JVET-G1001. With respect to LIC in JVET, LIC is based on a linear model for illumination changes, using a scaling factor a and an offset b. Such LIC is enabled or disabled adaptively for each inter-mode coded coding unit (CU). When LIC applies for a CU, a least square error method is employed to derive the parameters a and b by using the neighboring samples of the current CU and their corresponding reference samples. For example, as illustrated in FIG. 5A and FIG. 5B, the subsampled (2:1 subsampling) neighboring samples of the CU and the corresponding pixels (identified by motion information of the current CU or sub-CU) in the reference picture are used. In some examples, the IC parameters are derived and applied for each prediction direction separately. In some examples, an illumination compensation flag can be signalled for a CU to indicate whether LIC applies or not. In some examples, such as when a CU is coded with merge mode, the illumination compensation flag may be copied from neighboring blocks, in a way similar to motion information copy in merge mode.

According to LIC, the luminance value (of a sample, or pixel) is compensated for in the inter-prediction in a linear form, a*p+b, where p is a sample in inter-prediction, a is a scaling factor, and b is an offset. The scaling factor a and offset b are the parameters derived using neighboring samples of the current block and neighboring samples of the reference block (e.g., as shown in FIG. 5A and FIG. 5B), which is used for inter-prediction. For example, inter-prediction can first be derived using motion information signaled for an inter-coded block, then parameters a and b can be derived, and prediction refinement can then be performed. Parameters can be derived by minimizing the difference between the neighboring reconstructed samples of the current block and the neighboring samples of the reference block used for inter-prediction. In some cases, the minimization can be performed using a linear least squares method and/or any other suitable minimization method.

Figure 6:
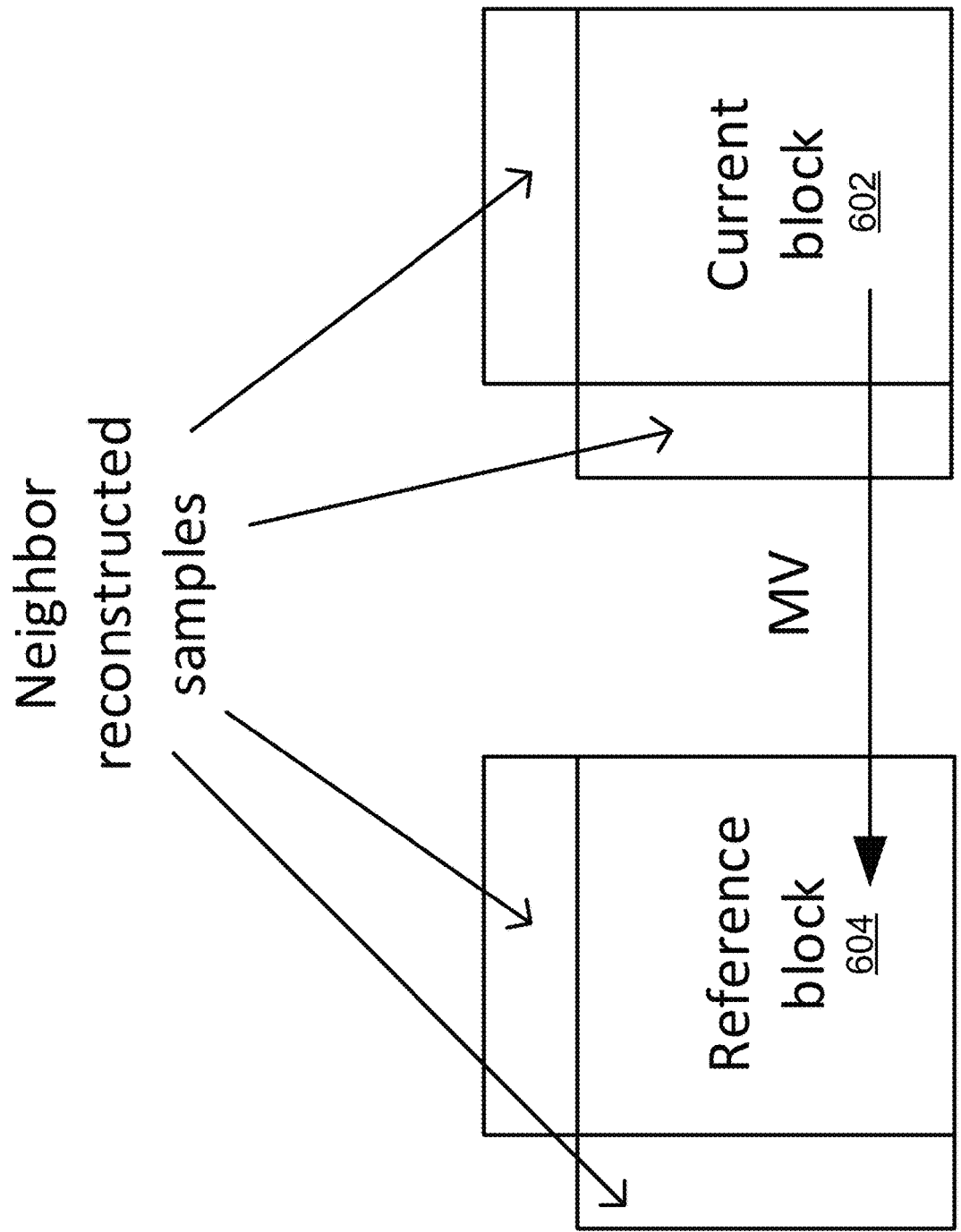
FIG. 6 is a conceptual diagram illustrating an example of neighbor reconstructed samples of a current block and neighbor samples of a reference block used for uni-directional inter-prediction, in accordance with some examples.

FIG. 6 is a diagram illustrating an example of neighbor reconstructed samples of a current block 602 and neighbor samples of a reference block 604 used for uni-directional inter-prediction. A motion vector MV can be coded for the current block 602, where the MV can include a reference index to a reference picture list and/or other motion information for identifying the reference block 604. For example, the MV can include a horizontal and a vertical component that provides an offset from the coordinate position in the current picture to the coordinates in the reference picture identified by the reference index.

Figure 7:
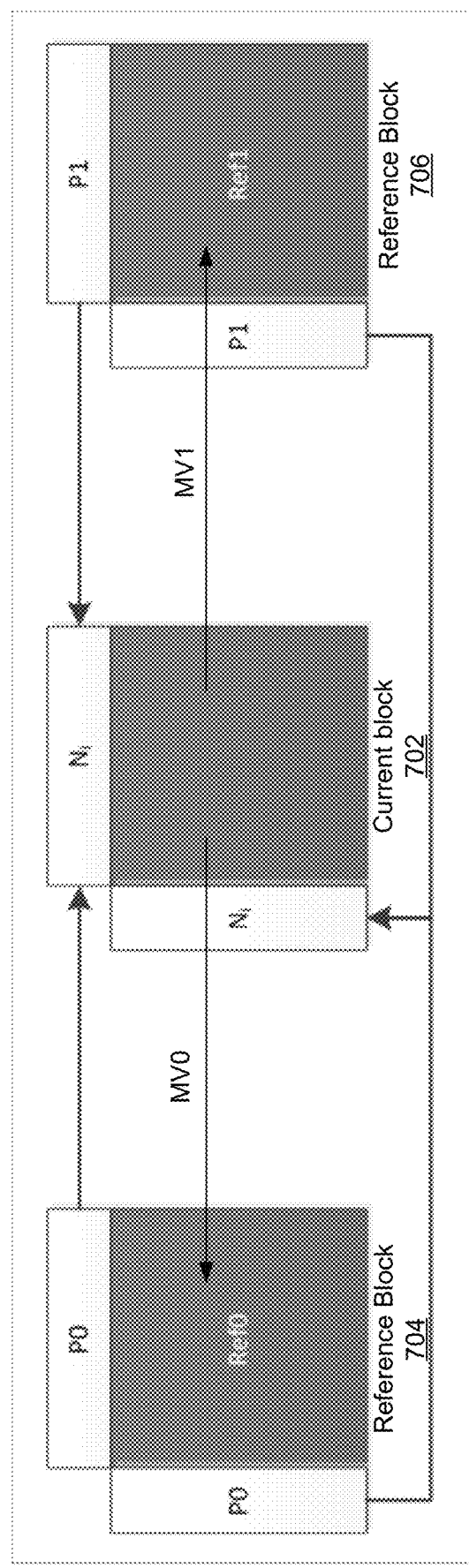
FIG. 7 is a conceptual diagram illustrating an example of neighbor reconstructed samples of a current block and neighbor samples of two reference blocks used for bi-directional inter-prediction, in accordance with some examples.

FIG. 7 is a diagram illustrating an example of neighbor reconstructed samples of a current block 702 and neighbor samples of a first reference block 704 and a second reference block 706 used for bi-directional inter-prediction. In this case, two motion vectors MV0 and MV1 can be coded for the current block 702 to identify the first reference block 704 and a second reference block 706, respectively.

Illumination compensation (IC) parameters can include an offset, one or more weights, a shift number, or other suitable illumination compensation parameters. A weight can also be referred to as a scaling factor. IC parameters can be derived for inter-prediction (e.g., uni-directional inter-prediction). For bi-directional inter-prediction, the one or more weights can include a first weight for the first reference picture and a second weight for the second reference picture.

In some implementations, a linear least square regression can be used to estimate the LIC parameters in bi-predictive motion compensation. In one example, the derivation of the LIC parameters can be done by solving a cost function. For example, the cost function can include using a least-square function. For instance, a subset of samples from one or more neighboring blocks of the current block can be used to derive the LIC parameters. Samples from neighboring blocks of the current block can be used to find a possible illuminance changes in the current block 702, because it can be assumed that there is a strong correlation between the neighboring samples (in the neighboring blocks) and the current samples (in the current block 702). For instance, it can be assumed that the current block and the neighboring block, which share the same motion information, should contain very similar illuminance values. Another reason to use neighboring samples is that the current block has not yet been predicted, and there may not be pixels to use from the current block, in which case the neighboring samples (which have been reconstructed) can be used in performing the motion compensation of the current block.

In one illustrative example, either a top neighbor, a left neighbor, or both top neighbor and the left neighbor may be used. For instance, a subset of samples from a top neighbor and a left neighbor (Ni) for the current block 702, a subset of pixels from a top neighbor and a left neighbor (P0) of the first reference block 704, and a subset of pixels from a top neighbor and a left neighbor (P1) of the second reference block 706 can be used in deriving the IC parameters for the current block 702. The samples of the neighboring blocks P0 and P1 can include samples corresponding to the neighboring samples of the neighboring blocks $N_i$. In some cases, the corresponding samples used in the neighboring blocks P0 and P1 can be identified by motion information of the current block. In one illustrative example, the motion vectors can be signaled through either the merge mode or the AMVP mode. The reference pictures can be identified using their reference indexes, the reference blocks 704 and 706 within the reference pictures using the motion vectors MV0 and MV1, respectively.

In some examples, more than one derivation method to derive the LIC parameters can be performed. An example of an inter-prediction engine or module for deriving the LIC parameters at the encoder side can include the prediction processing unit 41, the motion estimation unit 42, and/or the motion compensation unit 44 shown in FIG. 11. An example of an inter-prediction engine or module for deriving the LIC parameters at the decoder side can include the prediction processing unit 81 and/or the motion compensation unit 82 shown in FIG. 11. In such examples, the encoder or other transmitter-side device can signal to the decoder which derivation method is to be used at a sequence level (e.g., in the VPS and/or the SPS), at the picture level (e.g., in the PPS), at the slice level (e.g., in the slice header), at the CTU level, at CU level, at PU level, or a combination thereof, or other suitable signaling level.

In some examples, the least square solution can be calculated based on multiple lines and/or columns of a neighbor (e.g., either top neighbor, a left neighbor, both the top and left neighbors, or other neighbors). Example numbers (and in some cases, the typical numbers) of lines and/or columns includes one, two, four, or any other suitable number of rows and/or columns. The cost functions mentioned above may be modified when multiple lines and/or columns of the neighboring block are used. For example, if the blocks are 16×16 blocks (16 rows of pixels by 16 columns of pixels), and if two lines from the top neighboring block and two columns from the left neighboring block are used, the neighboring block $N_i$ will include 64 samples (32 samples from the left neighboring block and 32 samples from the top neighboring block). In such an example, the neighbors P0 and P1 will also include 64 samples.

In some cases, integer-positioned samples (or pixels) are used for the derivation of the LIC parameters. In some cases, fractional-positioned samples are used for the derivation of the LIC parameters. In some cases, integer-positioned samples and fractional-positioned samples can both be used. For example, the true displacements of moving objects between pictures are continuous and tend to not follow the sampling grid of the pictures in a video sequence. Because of this, fractional accuracy can be used for motion vectors instead of integer accuracy, leading to a decrease in residual error and an increase in coding efficiency of video coders. If a motion vector has a fractional value, the reference block needs to be interpolated accordingly. For example, a motion vector for a sample of a current block can point to a fractional-pel position in a reference block. A fractional-pel position refers to samples (e.g., a luma sample) at fractional sample locations (non-integer locations) in the block. Such locations need to be generated by interpolation. In one example when factional-positioned samples are used, an interpolated or filtered version of the reference block neighbors (e.g., P0 or P1) can be used to reduce the quantization error from the reconstructed pixels when deriving the LIC parameters. Such an interpolated version of a template can be generated using one or more interpolation filters.

In some examples, only the luma component needs to be used to jointly optimize the LIC parameters for both Ref0 and Ref1. Alternatively, both luma and chroma components can be considered during the derivation of the bi-predictive LIC parameters. The encoder can signal to the decoder (in a parameter set, in an SEI message, or other suitable signaling mechanism) whether or not to apply LIC to one or more of the chroma components, or only to apply LIC to the luma components.

In some examples, one or more flags can be signaled between an encoder and a decoder at a block level to indicate whether particular tools have been applied (e.g., LIC, merge mode, among others) in the prediction of the block. For example, a merge mode flag can be stored with motion information for a current block. Whether the current block has been coded using merge mode can be inferred from the motion information based on the merge mode flag. In addition to the merge mode flag, an illumination compensation flag can also be used to indicate that the CU has been coded with illumination compensation applied. When a CU is coded with merge mode, the illumination compensation flag can be copied from neighboring blocks, in a way similar to motion information copy in merge mode. Otherwise, if the CU has not been coded with merge mode (e.g., an AMVP mode was used instead), an illumination compensation flag (or "LIC flag") can be signalled for the CU to indicate whether LIC applies or not.

As previously mentioned, one or more motion information candidate lists can be used in motion prediction. For example, a motion vector (MV) candidate list can be maintained for the merge mode and/or the AMVP mode. An MV candidate list can include multiple MV candidates, where the number of candidates to be included in the MV candidate list can be based on the motion prediction mode (e.g., merge mode or AMVP mode). Each MV candidate in the MV candidate list can include one or more motion vectors, reference indices, and/or other motion information such as an LIC flag.

In some examples, a pruning process can be involved when adding or inserting new candidates into an MV candidate list. For example, in some cases it is possible for MV candidates from different blocks to include the same information. In such cases, storing duplicative motion information of multiple MV candidates in the MV candidate list can lead to redundancy and a decrease in the efficiency of the MV candidate list. In some examples, the pruning process can eliminate or minimize redundancies in the MV candidate list. For example, the pruning process can include comparing a potential MV candidate to be added to an MV candidate list against the MV candidates which are already stored in the MV candidate list. If a match is found based on this comparison, adding the potential MV candidate to the MV candidate list can be avoided.

As previously mentioned, a motion vector candidate can include different types of motion information, such as motion vector(s), reference indices, an LIC flag, among others. In some examples, the motion information comparison in the pruning process can include comparing all of the motion information included in an MV candidate against the corresponding motion information of stored MV candidates in the MV candidate list. In some examples, the comparison may be restricted to one or more types of motion information being compared while some types of motion information may be excluded from the comparison.

For example, in some implementations of motion information comparison used in a pruning process, LIC flags can be included in the motion information used for comparison. For instance, in addition to comparing the motion vector(s) of a potential MV candidate with motion vector(s) of stored MV candidates in an MV candidate list, an LIC flag of the potential MV candidate can also be compared with a respective LIC flags of stored MV candidates in the MV candidate list. In such examples, the potential MV candidate may be pruned or excluded from being added to the MV candidate list if there is a match in the LIC flags in addition to a match in the motion vectors(s) between the potential MV candidate and one of the stored MV candidates.

In other implementations of motion information comparison used in a pruning process, LIC flags can be excluded from the motion information used for comparison. For instance, the motion vector(s) of a potential MV candidate may be compared with motion vector(s) of stored MV candidates in an MV candidate list, but an LIC flag of the potential MV candidate may be excluded from comparison with respective LIC flags of stored MV candidates in the MV candidate list. In such examples, the potential MV candidate may be pruned or excluded from being added to the MV candidate list when there is a match in the motion vectors(s) between the potential MV candidate and one of the stored MV candidates, regardless of whether the LIC flag of the potential MV candidate matches the LIC flag of the stored MV candidate which yielded the match in the motion vector(s). Excluding the LIC flags from the motion information comparison for pruning can simplify the comparison process because less information is being compared. However, even though there may be an efficiency gain in excluding the LIC flags from the motion information comparison, there is a possibility for performance being downgraded, as explained below.

In an illustrative example of implementations where the LIC flags are excluded from the motion information comparison for pruning, a potential MV candidate may be excluded from being added to the MV candidate list based on the motion vector(s) of the potential MV candidate yielding a match with the motion vector(s) of a previously stored MV candidate in the MV candidate list. In this example, the LIC flag of the potential MV candidate may mismatch the LIC flag of the stored MV candidate. In an example, the mismatch may be based on the LIC flag of the stored MV candidate being a false value and the LIC flag of the potential MV candidate being a true value. Since the potential MV candidate is pruned, the stored MV candidate is retained in the MV candidate list with its associated LIC flag having the false value. However, pruning the potential MV candidate with the associated LIC flag having a true value can mean that even though illumination compensation was determined to be applicable for the potential MV candidate, this determination will not be registered in the MV candidate list. This could result in a scenario where the motion prediction applied to a block using the stored MV candidate may not include illumination compensation when applying illumination compensation may have resulted in better performance. Accordingly, there are situations in which excluding the LIC flags from the motion information comparison for pruning can lead to performance degradations.

Systems and techniques described herein include improvements to illumination compensation. According to some aspects, an example pruning process is described for evaluating MV candidates to be added to an MV candidate list. In some examples, the pruning process can take into account an LIC flag of a potential MV candidate to be added to an MV candidate list, while avoiding the above-mentioned performance degradation.

Figure 8:
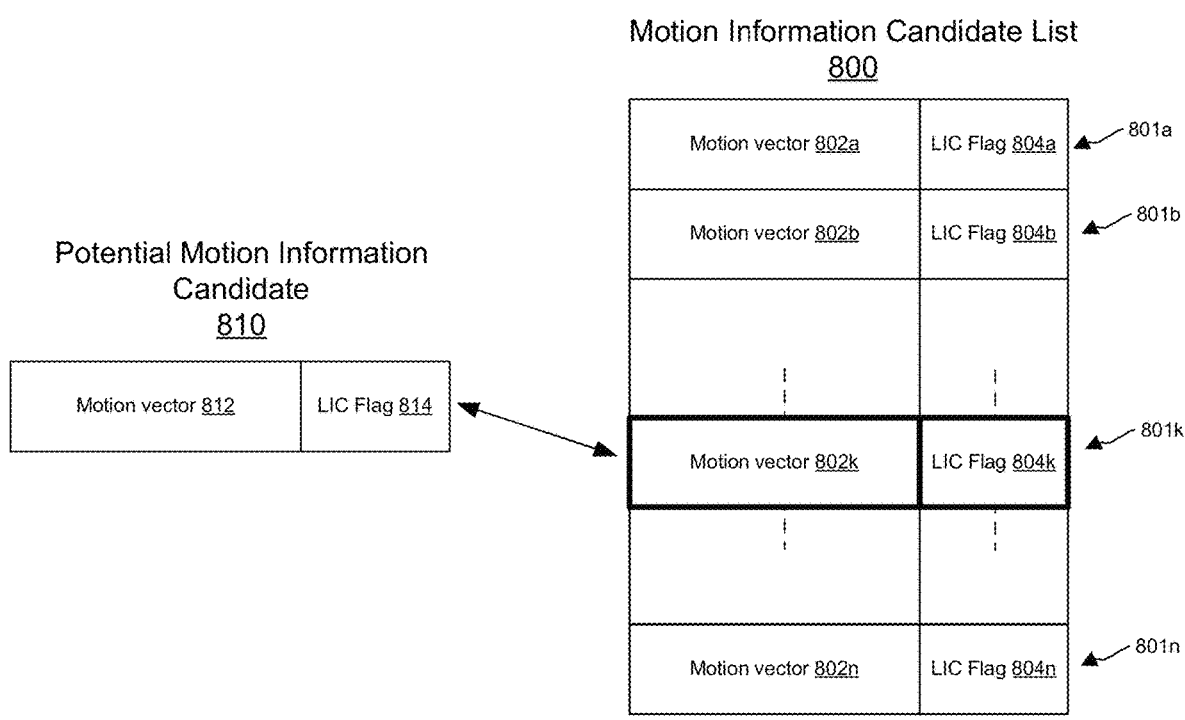
FIG. 8 is conceptual diagram illustrating motion information candidate list construction using example pruning techniques, in accordance with some examples.

FIG. 8 is a diagram illustrating motion information candidate list construction using example pruning techniques. A motion information candidate list 800 is shown to include several stored motion information candidates 801a, 801b, through 801n, which include stored motion vectors 802a, 802b, through 802n and associated stored LIC flags 804a, 804b, through 804n. The motion information candidate list 800 can be used for motion prediction of one or more blocks in merge mode, AMVP mode, or other inter-prediction mode, as previously described. The motion information candidate list 800 can be generated separately by an encoding device and by a decoding device. For instance, the motion information candidate list 800 can be generated by an encoding device when encoding a block, and can be generated by a decoding device when decoding the block.

For example, in the merge mode, a stored motion vector (e.g., motion vector 802a) of a stored motion information candidate (e.g., motion information candidate 801a) can be used as a motion vector of a block, where illumination compensation for the block can be applied based on the associated stored LIC flag (e.g., LIC flag 804a associated with the motion vector 802a) of the stored motion information candidate. In the case of AMVP mode, a stored motion vector (e.g., motion vector 802b) of a stored motion information candidate (e.g., motion information candidate 801b) can be used to predict a motion vector of a block, where illumination compensation for the block can be applied based on the associated stored LIC flag (e.g., LIC flag 804b associated with the motion vector 802b) of the stored motion information candidate. In some examples, the motion information candidate list 800 can be used to store temporal motion vector predictor (TMVP) candidates, where one or more TMVP candidates can be added into motion information candidate list 800 after spatial motion vector candidates for merge or AMVP mode have been added, as noted above.

Accordingly, a stored motion vector (e.g., stored motion vector 802a) of a stored motion information candidate (e.g., motion information candidate 801a) in the motion information candidate list 800 can be used for motion prediction of a block of video data using any suitable prediction technique (e.g., in the merge mode, AMVP mode, or other). Correspondingly, illumination compensation for the block can be based on the associated stored LIC flag (e.g., LIC flag 804a) of the motion information candidate. In some examples, if the stored LIC flag has a true value, then illumination compensation can be applied for the block, or if the stored LIC flag has a false value, then illumination compensation can be avoided and not performed for the block. If illumination compensation is applied, then one or more LIC parameters for the block can be calculated as discussed with reference to FIG. 7 above, or using any other suitable technique.

In some examples, the motion information candidate list 800 can be created by populating the motion information candidate list 800 with the one or more motion information candidates. As previously mentioned, a pruning process can be implemented when adding potential motion information candidates to the motion information candidate list 800 to avoid redundancies among the stored motion information candidates. For example, the pruning process can be used for determining whether a potential motion information candidate 810 can be added to the motion information candidate list 800. As shown in FIG. 8, the potential motion information candidate 810 can include a motion vector 812 and an associated LIC flag 814. In some examples, the motion information such as the motion vector 812 and the associated LIC flag 814 included in the potential motion information candidate 810 can be associated with a block of video data. For example, the motion vector 812 and the LIC flag 814 can be used for motion prediction of the block of video data based on adding the potential motion information candidate 810 to the motion information candidate list 800. In some examples, the motion vector 812 and associated LIC flag 814 of the potential motion information candidate 810 can be added to the motion information candidate list 800 subject to the pruning process as follows.

In an example implementation, the motion vector 812 of the potential motion information candidate 810 may be compared with one or more stored motion vectors 802a-802n of the motion information candidate list 800 to determine if there is a match. For example, the horizontal displacement (Δx) and the vertical displacement (Δy) (indicating a position of a reference block relative to a position of the current block) of the stored motion vector 802a can be compared to the horizontal displacement (Δx) and the vertical displacement (Δy) of the motion vector 812 of the potential motion information candidate 810.

In some examples, the potential motion information candidate 810 can include or be associated with a reference index, where, as previously described, the reference index may indicate a particular reference picture that can be used for motion prediction of a block of video data. Similarly, the one or more stored motion vectors 802a-802n can include or be associated with corresponding one or more reference indices. In some examples, comparing the potential motion information candidate 810 with one or more stored motion vectors 802a-802n can include comparing the reference index of the potential motion information candidate 810 with respective one or more reference indices of the one or more stored motion vectors 802a-802n.

In some examples, the potential motion information candidate 810 can also include or be associated with a picture order count (POC), where, as previously described, the POC can be used to identify a display order of a picture, reference picture list construction, derivation of reference picture set, or other. Similarly, the one or more stored motion vectors 802a-802n can include or be associated with corresponding one or more POCs. In some examples, comparing the potential motion information candidate 810 with one or more stored motion vectors 802a-802n can include comparing the POC of the potential motion information candidate 810 with respective one or more POCs of the one or more stored motion vectors 802a-802n.

In various examples, comparison of the potential motion information candidate 810 with one or more stored motion vectors 802a-802n can include comparing any relevant motion information, where the motion information can include motion vectors, reference indexes, POCs or other. In some examples, if the comparison of the relevant motion information reveals that the motion vector 812 of the potential motion information candidate 810 does not match any of the one or more stored motion vectors 802a-802n, then the potential motion information candidate 810 is not considered as a candidate to be pruned. The potential motion information candidate 810 can be added to the motion information candidate list 800 in such examples where it is determined that potential motion information candidate 810 is not considered as a candidate to be pruned.

On the other hand, if the comparison reveals that the motion vector 812 of the potential motion information candidate 810 matches one of the one or more stored motion vectors 802a-802n, then the potential motion information candidate 810 is considered as a candidate to be pruned. In an illustrative example, the motion vector 812 of the potential motion information candidate 810 can match a stored motion vector 802k of a stored motion information candidate, where a stored LIC flag 804k may be associated with the stored motion vector 802k. In this example, the potential motion information candidate 810 may be pruned. For instance, potential motion information candidate 810 may not be inserted into the motion information candidate list 800 because the motion vector 812 would be redundant with the matching stored motion vector 802k which is already present in the motion information candidate list 800. However, in example aspects, the associated stored LIC flag 804k can be updated based on the value of the stored LIC flag 804k and the value of the LIC flag 814 of the potential motion information candidate 810, even though the potential motion information candidate 810 may be pruned. For example, the associated stored LIC flag 804k can be updated if the value of the stored LIC flag 804k and the value of the LIC flag 814 are different, but not updated if the value of the stored LIC flag 804k and the value of the LIC flag 814 are the same.

In one illustrative example, the stored LIC flag 804k of the stored motion information candidate can be updated to a first value from a stored second value (where the first value is different from the second value) if the LIC flag 814 of the potential motion information candidate 810 is the first value. For example, if the first value is a true value and the second value is a false value, then the stored LIC flag 804k is updated to a true value (from a previously stored false value) if the LIC flag 814 is a true value. Similarly, the stored LIC flag 804k is updated to a false value (from a previously stored true value) if the LIC flag 814 is a false value and the stored second value of the LIC flag 804k is a true value. Thus, the stored value of the stored LIC flag 804k can be updated when its stored value does not match the value of the LIC flag 814.

On the other hand, if the stored value of the stored LIC flag 804k matches the value of the LIC flag 814, then the stored value of the stored LIC flag 804k is not updated. For example, if the stored value of the stored LIC flag 804k and the LIC flag 814 are both true values then the LIC flag 804k is retained as its stored, true value. Similarly, if the stored value of the stored LIC flag 804k and the LIC flag 814 are both false values then the stored LIC flag 804k is retained at its stored, false value.

As can be appreciated, the above process of updating the LIC flag 804k based on the value of the stored LIC flag 804k and the value of the LIC flag 814 can be implemented using a logical OR function when the motion vector 802k matches the motion vector 812 (i.e., when the potential motion information candidate 810 may be pruned). For example, the following pseudo code notation can be used to illustrate the process of updating the stored LIC flag 804k: If (motion vector 802k=motion vector 812), then stored LIC flag 804k=stored LIC flag 804k||LIC flag 814. Accordingly, it is possible to update the stored LIC flag 804k using a suitable functional block.

In example aspects, the motion information can be signaled between two devices, e.g., from an encoding device to a decoding device. In some examples, the motion information signaled between the two devices can include one or more LIC flags. In some examples, one or more LIC flags can be signaled along with motion information for performing motion prediction of a block.

In some examples, as described above, one or more stored LIC flags 804a-804n can be included along with stored motion vectors 802a-802n in the motion information candidate list 800. In such examples where a motion information candidate list is used for motion prediction (and where applicable, illumination compensation) of a block, the motion information candidate list may be constructed at the encoder and the decoder separately. Information referencing the motion information candidate list can be signaled between the encoder and the decoder.

For example, in the merge mode, index values to the stored motion information candidates 801a-801n can be signaled from an encoder to a decoder (e.g., in a syntax structure, such as the picture parameter set (PPS), sequence parameter set (SPS), video parameter set (VPS), a slice header, a supplemental enhancement information (SEI) message sent in or separately from the video bitstream, and/or other signaling). In some examples, the LIC flags 804a-804n can also be signaled from the encoder to the decoder. The decoder may construct a motion information candidate list and use the signaled references or indexes to obtain one or more motion information candidates from the constructed motion information candidate list to use for motion prediction. For example, the decoding device 112 may construct a motion information candidate list similar to the motion information candidate list 800 and use a motion vector and LIC flag from an indexed location for motion prediction of the block.

In the case of AMVP mode, in addition to the references or indexes, differences or residual values may also be signaled as deltas. In some examples, the LIC flags 804a-804n can also be signaled from the encoder to the decoder in the AMVP mode. For example, as previously described for the AMVP mode, the decoder may construct one or more motion information candidate lists and apply the delta values to one or more motion information candidates obtained using the signaled index values, along with LIC information, where an LIC flag is included, in performing motion prediction of the block. Accordingly, information related to motion information candidates in a motion information candidate list, including information related to one or more LIC flags which can be stored in the motion information candidate list, can be signaled between the encoder and the decoder for the AMVP mode.

As will be appreciated, signaling information between two devices can have associated costs. Thus, it may be desirable to improve the signaling efficiency and reduce costs where possible. In some examples, reducing redundancies in the information being signaled can lead to signaling less information and corresponding cost savings. In some examples, switching power can be a cost associated with signaling information, where frequently switching between different syntax elements, bits, or symbols can increase switching power. Thus, reducing switching power can also help in reducing signaling costs. In some examples, the signaling costs associated with signaling the LIC flags (in the merge mode, AMVP mode, or other prediction mode) can be reduced using one or more of the following techniques.

In some examples, an LIC flag predictor can be used to improve the signaling of LIC flags. In some examples, the LIC flag predictor can be used to make a prediction of whether an LIC flag will have a true value or a false value. A prediction value (true or false) obtained from the LIC flag predictor can be compared with the actual value of the associated LIC flag to yield a comparison flag. In this manner, a comparison flag can be generated for each LIC flag being signaled. In some examples, one or more comparison flags can be signaled in place of corresponding one or more LIC flags, where each of the one or more comparison flags include an indication of whether an associated LIC flag's value matches its prediction value. For example, a comparison flag's value of "1" can indicate that an associated LIC flag's value matches its prediction value, while the comparison flag's value of "0" can indicate that the associated LIC flag's value does not match its prediction value.

Signaling the comparison flags instead of the LIC flags can improve signaling efficiencies. For example, if the LIC predictor is configured to make predictions with a high level of accuracy, then there will be a high incidence of the LIC flag values matching their respective predicted values. This means that there may be a high incidence of comparison flags having a value of "1" being signaled. In such cases, compression techniques such as entropy coding or other coding algorithms can be used to efficiently signal a plurality of repeating patterns such as a stream of bits of value "1" being signaled. Accordingly, signaling the comparison flags based on prediction values matching the LIC flag values can lead to signaling efficiencies.

In some examples, information related to the one or more stored LIC flags 804a-804n of the motion information candidate list 800 can be signaled using the comparison flags. For example, LIC flag prediction can be applied to predict the values of the stored LIC flags 804a-804n. The predictions can yield respective prediction values which can be compared with the actual values of the stored LIC flags 804a-804n. A corresponding number of comparison flags can be generated based on the comparisons, with one comparison flag generated for each of the stored LIC flags 804a-804n. The comparison flags can be signaled instead of signaling information related to the stored LIC flags 804a-804n. For example, an encoded bitstream can be signaled from the encoding device 104 to the decoding device 112 where the comparison flags can be included in the encoded bitstream. By applying entropy coding or other compression algorithms, the signaling efficiencies associated with signaling information related to the stored LIC flags 804a-804n can be improved.

In some examples, the LIC flag prediction for an LIC flag can be obtained using one or more other LIC flags. For example, the LIC flag prediction for an LIC flag of a current block of video data can be based on one or more LIC flags of corresponding one or more neighboring blocks of the current block. For example, the one or more neighboring blocks of the current block can include an immediate neighbor such as a left neighbor, a top neighbor, a right neighbor, or a bottom neighbor of the current block.

In some examples, if at least one of the neighbor blocks of the current block has an associated LIC flag set to a first value, then the LIC flag predictor for the current block's LIC flag can also be set to the first value. For example, if the first value is a true value, then if at least one of the immediate neighbors of the current block has an associated LIC flag set to a true value, then the LIC flag prediction value for the current block's LIC flag can be set to a true value. Otherwise, the LIC flag prediction value for the current block's LIC flag can be set to a second value such as a false value.

In some examples, a count of the number of neighboring blocks having their associated LIC flags set to a first value can be determined. The LIC flag prediction for the current block's LIC flag can be obtained by comparing this count to a predetermined threshold. For example, if the first value is a true value, then a count of the number of neighboring blocks having their associated LIC flags set to a true value can be determined, and this count can be compared to a predetermined threshold. For example, in the case where a current block's four immediate neighboring blocks are considered in the current block's LIC flag prediction, the predetermined threshold can be set to two, three, or four. Correspondingly, if the number of neighboring blocks having their LIC flags set to a true value is greater than or equal to the predetermined threshold, then the LIC flag prediction for the current block's LIC flag can be a true value. Otherwise, the LIC flag prediction value for the current block's LIC flag can be set to a second value such as a false value.

In some examples, the LIC flag prediction of a current block's LIC flag can be determined based on a motion information candidate which may be used for predicting motion information of the current block. For example, one or more motion information candidates such as the stored motion information candidates in the motion information candidate list 800 can be used for motion prediction of the current block. As previously mentioned, the motion information candidates may include respective stored LIC flags 804a-804n along with the motion vectors 802a-802n. The LIC flag of a motion information candidate in such examples (or other examples) is referred to as a candidate LIC flag. In some examples, the LIC flag predictor for the LIC flag of the current block can be set to the value of the candidate LIC flag of a motion information candidate used for motion prediction of the current block. For example, if the candidate LIC flag is a true value, then the prediction value of the LIC flag of the current block can be set to a true value. Otherwise, if the candidate LIC flag is a false value, then the prediction value of the LIC flag of the current block can be set to a false value In some examples, signaling the LIC flag can be improved using techniques for context based modeling of the LIC flag. For example, when an LIC flag is signaled from an encoding device to a decoding device, the LIC flag can be context coded or other context based modeling can be applied to the LIC flag. In some examples, the context based modeling of the LIC flag can include assigning a context to the LIC flag. In some examples, the assigned context can be used for context based coding and signaling rather than signaling the LIC flag itself. For example, the contexts of one or more LIC flags to be signaled can be coded using a context coding technique such as context adaptive variable length coding, context adaptive binary arithmetic coding, syntax-based context-adaptive binary arithmetic coding, probability interval partitioning entropy coding, or another suitable entropy encoding technique. The contexts, coded using the context based coding technique can be signaled to improve signaling efficiencies.

In some examples, an LIC flag of a current block can be coded using context based coding. For example, a context for the LIC flag can be assigned based on LIC flag values of one or more neighboring blocks of the current block. For example, the current block can have four immediate neighboring blocks such as a left neighbor, above neighbor, right neighbor, and below neighbor. In an example, if at least one of the neighboring blocks has an associated LIC flag set to a first value, then a first context can be assigned to the LIC flag of the current block, otherwise a second context may be assigned to LIC flag of the current block. For example, if at least one of the neighboring blocks has an associated LIC flag set to a true value, then a first context associated with the true value can be assigned to the LIC flag of the current block, otherwise a second context associated with a false value may be assigned to the LIC flag of the current block In some examples, a count of a number of neighboring blocks whose associated LIC flags have the first value can be determined. The count can be compared against a predefined threshold, and the context for the LIC flag of the current block may be based on the comparison. For example, if the count exceeds the predefined threshold then a first context may be assigned to the LIC flag of the current block, otherwise a second context may be assigned to the LIC flag of the current block.

In some examples, the context for the LIC flag of the current block can be assigned based on the size of the current block. For example, the size of the current block can be determined based on one or more dimensions such as a width of the current block, a height of the current block, an area of the current block equal to the width multiplied by the height, or other. In some examples, a first context can be assigned to the LIC flag if the area of the current block is less than or equal to a predefined value, or a second context can be assigned to the LIC flag if the area of the current block is greater than the predefined value. For example, the predefined value can include a threshold value N, where N can be set to a value such as 32 or another value.

FIG. 9 is a flowchart illustrating an example of a process 900 of decoding video data by using a motion information candidate list. At block 902, the process 900 includes obtaining an encoded video bitstream including video data. In some examples, the video data can include encoded video data (e.g., in the encoded video bitstream), such as when the process 900 is performed by a decoding device. The video data can include a plurality of pictures, and the pictures can be divided into a plurality of blocks, as previously described. The video data can also include motion information for the pictures and/or blocks, which can be used to perform motion compensation.

At 904, the process 900 includes determining motion information associated with a block of the video data, the motion information comprising at least a motion vector and an illumination compensation flag. For example, the potential motion information candidate 810 of FIG. 8 can include motion information associated with the block of video data, where the potential motion information candidate 810 includes the motion vector 812 and the LIC flag 814.

At 906, the process 900 includes comparing the motion information with stored motion information in a motion information candidate list, the stored motion information comprising a stored motion vector and a stored illumination compensation flag. For example, the motion information candidate list 800 can include one or more stored motion vectors 802*a*-802*n* along with associated stored LIC flags 804*a*-804*n* as discussed previously. Adding the potential motion information candidate 810 to the motion information candidate list 800 can be subject to pruning. In example implementations of the pruning process, the potential motion information candidate 810 can be compared with the stored motion information in the motion information candidate list 800. For example, the one or more stored motion vectors 802*a*-802*n* can include the stored motion vector 802*k* with an associated stored LIC flag 804*k*. In some examples, the comparison process can include comparing the motion information included in the potential motion information candidate 810 with the stored motion information which includes the stored motion vector 802*k* with the associated stored LIC flag 804*k*.

At 908, the process 900 includes determining that the motion vector matches the stored motion vector. For example, the potential motion information candidate 810 may be pruned if its motion vector 812 matches the stored motion vector 802*k*. In an example where the potential motion information candidate 810 may be pruned, the motion vector 812 may be determined to match the stored motion vector 802*k*.

At 910, the process 900 includes determining whether to update the stored illumination compensation flag based on a value of the illumination compensation flag and a value of the stored illumination compensation flag. For example, updating the stored LIC flag 804*k* in the motion information candidate list 800 can be based on a value of the stored LIC flag 804*k* and a value of the LIC flag 814 of the potential motion information candidate 810.

In some examples, updating the stored illumination compensation flag can include updating the stored illumination flag to a first value if the value of the illumination compensation flag is the first value and the value of the stored illumination compensation flag is a second value. For example, where the first value is a true value and the second value is a false value, the stored LIC flag 804*k* can be updated to the true value from a previously stored false value if the value of the LIC flag 814 is the true value. Similarly, where the first value is a false value and the second value is a true value, the stored LIC flag 804*k* can be updated to the false value from a previously stored true value if the value of the LIC flag 814 is the false value.

In some examples, the stored illumination flag is not updated if the value of the illumination compensation flag is a first value and the value of the stored illumination compensation flag is a first value. For example, the stored LIC flag 804*k* in the motion information candidate list 800 is not updated if the value of the stored LIC flag 804*k* is the same as the value of the LIC flag 814 of the potential motion information candidate 810. For example, where the first value is a true value the stored LIC flag 804*k* in the motion information candidate list 800 is not updated if the value of the stored LIC flag 804*k* the true value and the LIC flag 814 is the true value. Similarly, where the first value is a false value the stored LIC flag 804*k* in the motion information candidate list 800 is not updated if the value of the stored LIC flag 804*k* the false value and the LIC flag 814 is the false value.

In some examples, determining whether to apply illumination compensation for the block can be based on the value of the stored illumination compensation flag, where illumination compensation is to be applied if the value of the stored illumination compensation flag is a true value and illumination compensation is not to be applied if the value of the stored illumination compensation flag is a false value. For example, if the value of the stored LIC flag 804*k* (based on being updated or not updated as discussed above) is a true value, then illumination compensation may be applied to the block, otherwise illumination compensation may not be applicable for the block.

In some examples, applying illumination compensation for the block can include deriving one or more illumination compensation parameters for the block using one or more neighboring blocks of block and one or more neighboring blocks of a reference block used for inter-prediction of the block. For example, as previously explained the luminance value (of a sample, or pixel) can be compensated for in the inter-prediction in a linear form, a*p+b, where p is a sample in inter-prediction, a is a scaling factor, and b is an offset. The scaling factor a and offset b are parameters which can be derived using neighboring samples of the current block and neighboring samples of the reference block (e.g., as shown in FIG. 5A and FIG. 5B). In some examples, the one or more neighboring blocks of the current block can include one or more of a top neighboring block or a left neighboring block of the current block, and the one or more neighboring blocks of the reference block can include one or more of a top neighboring block or a left neighboring block of the reference block.

Figure 10:
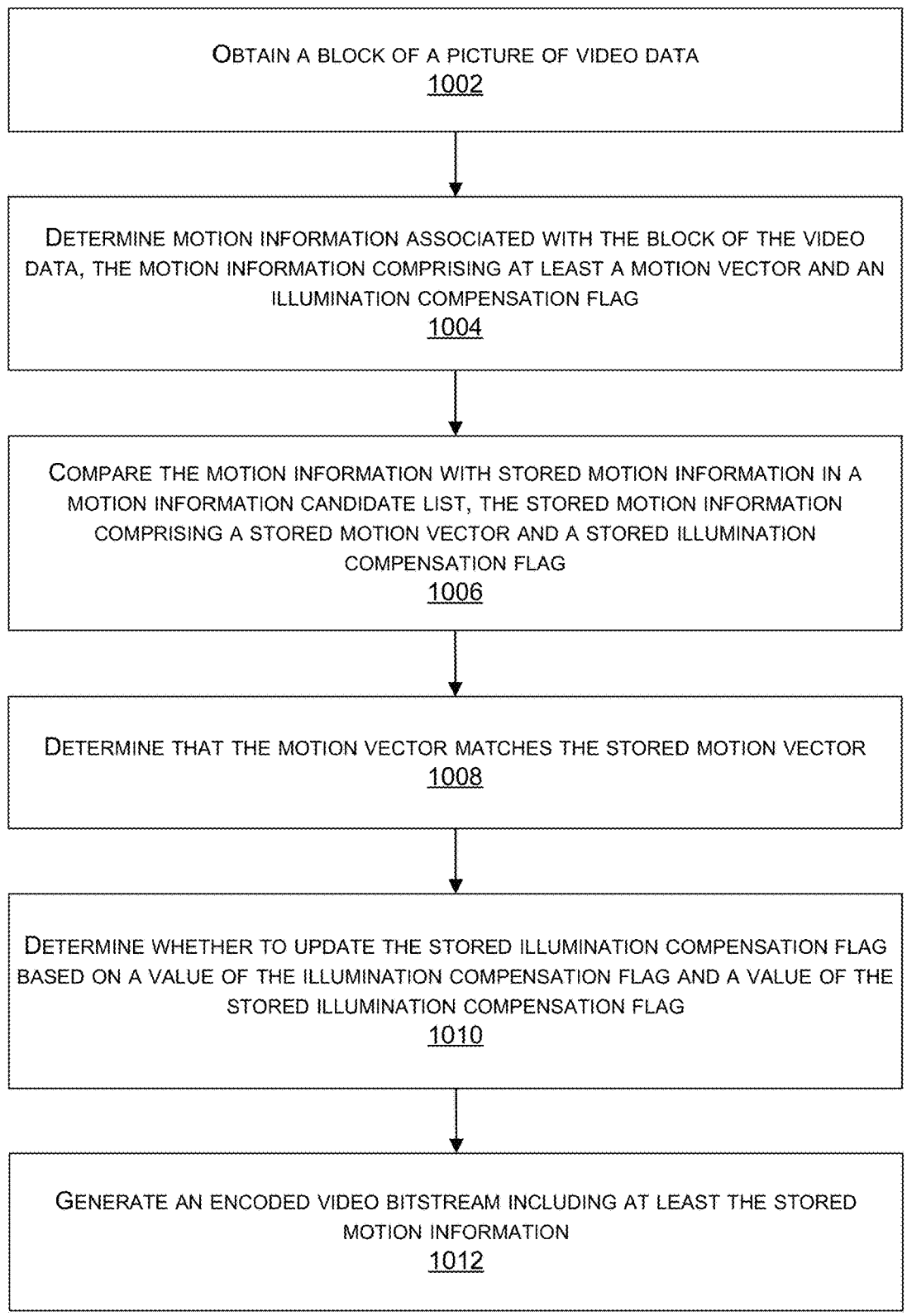
FIG. 10 is a flowchart illustrating an example of a process of encoding video data, including constructing a motion information candidate list using example pruning techniques, in accordance with some embodiments.

FIG. 10 is a flowchart illustrating an example of a process 1000 of encoding video data using a motion information candidate list. At block 1002, the process 1000 includes obtaining a current block of a picture of video data. The video data can include un-encoded video data. The video data can include a plurality of pictures, and the pictures can be divided into a plurality of blocks, as previously described. The process 1000 can determine motion information for the pictures and/or blocks, which can be used to perform motion compensation.

At 1004, the process 1000 includes determining motion information associated with a block of the video data, the motion information comprising at least a motion vector and an illumination compensation flag. For example, the potential motion information candidate 810 of FIG. 8 can include motion information associated with the block of video data, where the potential motion information candidate 810 includes the motion vector 812 and the LIC flag 814.

At 1006, the process 1000 includes comparing the motion information with stored motion information in a motion information candidate list, the stored motion information comprising a stored motion vector and a stored illumination compensation flag. For example, the motion information candidate list 800 can include one or more stored motion vectors 802*a*-802*n* along with associated stored LIC flags 804*a*-804*n* as discussed previously. Adding the potential motion information candidate 810 to the motion information candidate list 800 can be subject to pruning. In example implementations of the pruning process, the potential motion information candidate 810 can be compared with the stored motion information in the motion information candidate list 800. For example, the one or more stored motion vectors 802*a*-802*n* can include the stored motion vector 802k with an associated stored LIC flag 804k. In some examples, the comparison process can include comparing the motion information included in the potential motion information candidate 810 with the stored motion information which includes the stored motion vector 802k with the associated stored LIC flag 804k.

At 1008, the process 1000 includes determining that the motion vector matches the stored motion vector. For example, the potential motion information candidate 810 may be pruned if its motion vector 812 matches the stored motion vector 802k. In an example where the potential motion information candidate 810 may be pruned, the motion vector 812 may be determined to match the stored motion vector 802k.

At 1010, the process 1000 includes determining whether to update the stored illumination compensation flag based on a value of the illumination compensation flag and a value of the stored illumination compensation flag. For example, updating the stored LIC flag 804k in the motion information candidate list 800 can be based on a value of the stored LIC flag 804k and a value of the LIC flag 814 of the potential motion information candidate 810.

In some examples, updating the stored illumination compensation flag can include updating the stored illumination flag to a first value if the value of the illumination compensation flag is the first value and the value of the stored illumination compensation flag is a second value. For example, where the first value is a true value and the second value is a false value, the stored LIC flag 804k can be updated to the true value from a previously stored false value if the value of the LIC flag 814 is the true value. Similarly, where the first value is a false value and the second value is a true value, the stored LIC flag 804k can be updated to the false value from a previously stored true value if the value of the LIC flag 814 is the false value.

In some examples, the stored illumination flag is not updated if the value of the illumination compensation flag is a first value and the value of the stored illumination compensation flag is a first value. For example, the stored LIC flag 804k in the motion information candidate list 800 is not updated if the value of the stored LIC flag 804k is the same as the value of the LIC flag 814 of the potential motion information candidate 810. For example, where the first value is a true value the stored LIC flag 804k in the motion information candidate list 800 is not updated if the value of the stored LIC flag 804k the true value and the LIC flag 814 is the true value. Similarly, where the first value is a false value the stored LIC flag 804k in the motion information candidate list 800 is not updated if the value of the stored LIC flag 804k the false value and the LIC flag 814 is the false value.

At 1012, the process 1000 includes generating an encoded video bitstream including at least the stored motion information. For example, the encoding device 104 of FIG. 11 can generate and signal the encoded video bitstream including the stored motion information. In some examples, signaling the encoded video bitstream can be improved using one or more techniques for improving signaling efficiencies described above.

For example, an LIC flag predictor can be used to improve the signaling of LIC flags such as the one or more stored LIC flags 804a-804n. In some examples, a prediction value for the stored illumination compensation flag such as the stored LIC flag 804k may be determined, and the prediction value may be compared with the value of the stored LIC flag 804k. A comparison flag may be generated based on the comparison, where the comparison flag is set to a first value if prediction value matches the value of the illumination compensation flag or a second value if prediction value does not match the value of the illumination compensation flag. In some examples, the encoded video bitstream can be generated based on the comparison flag. For example, one or more comparison flags can be generated using a similar process for the one or more stored LIC flags 804a-804n of the motion information candidate list 800, and the comparison flags can replace the stored LIC flags 804a-804n in the encoded bitstream. By applying entropy coding or other compression algorithms, the signaling efficiencies associated with signaling the stored LIC flags 804a-804n can be improved.

In some implementations, the processes (or methods) described herein can be performed by a computing device or an apparatus, such as the system 100 shown in FIG. 1. For example, the processes can be performed by the encoding device 104 shown in FIG. 1 and FIG. 11, by another video source-side device or video transmission device, by the decoding device 112 shown in FIG. 1 and FIG. 12, and/or by another client-side device, such as a player device, a display, or any other client-side device. In some cases, the computing device or apparatus may include a processor, microprocessor, microcomputer, or other component of a device that is configured to carry out the steps of the processes described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and or decoding device. Although generally the techniques of this disclosure are performed by a video encoding device, the techniques may also be performed by a video encoder-decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 11:
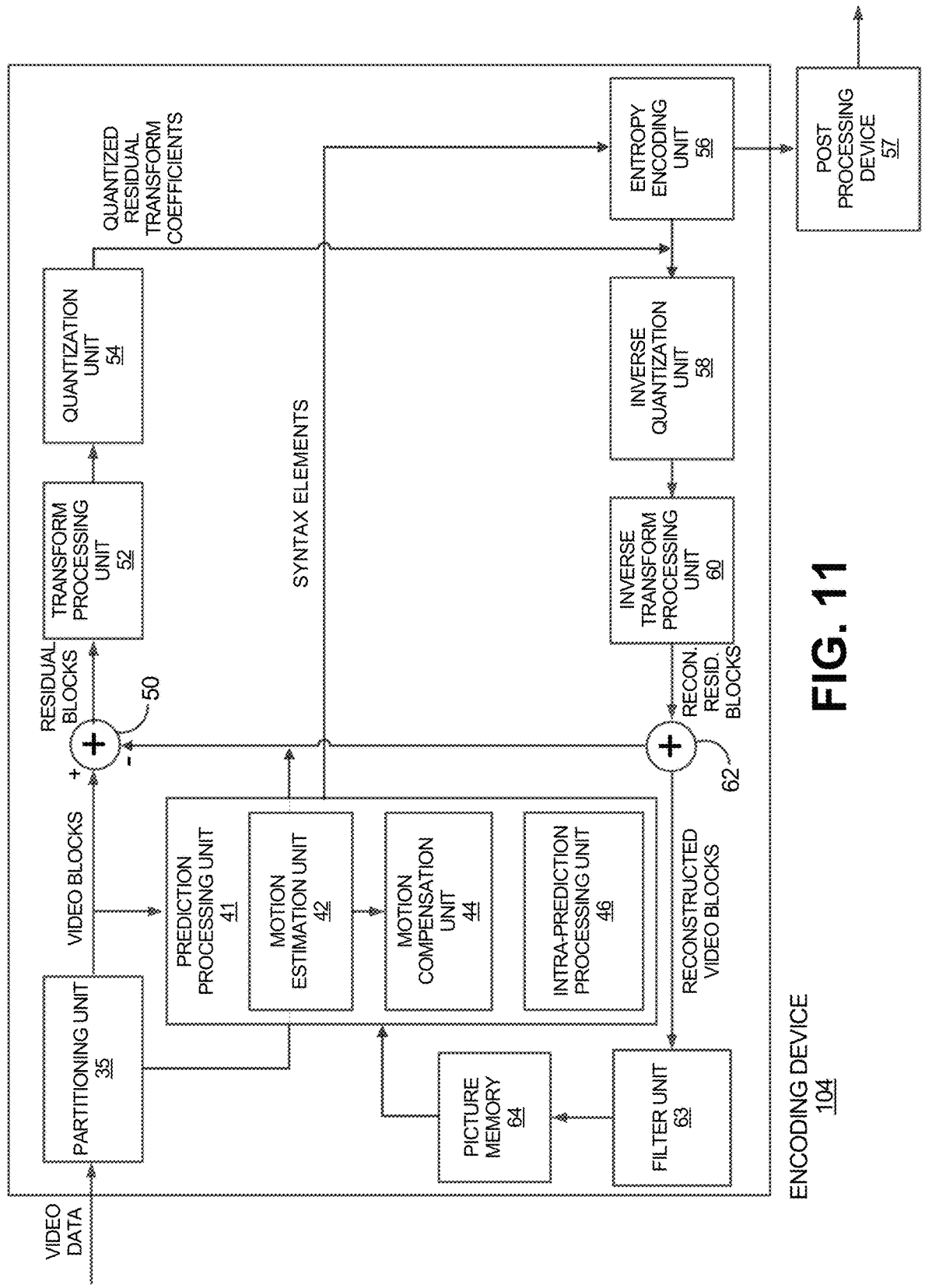
FIG. 11 is a block diagram illustrating an example video encoding device, in accordance with some examples.
Figure 12:
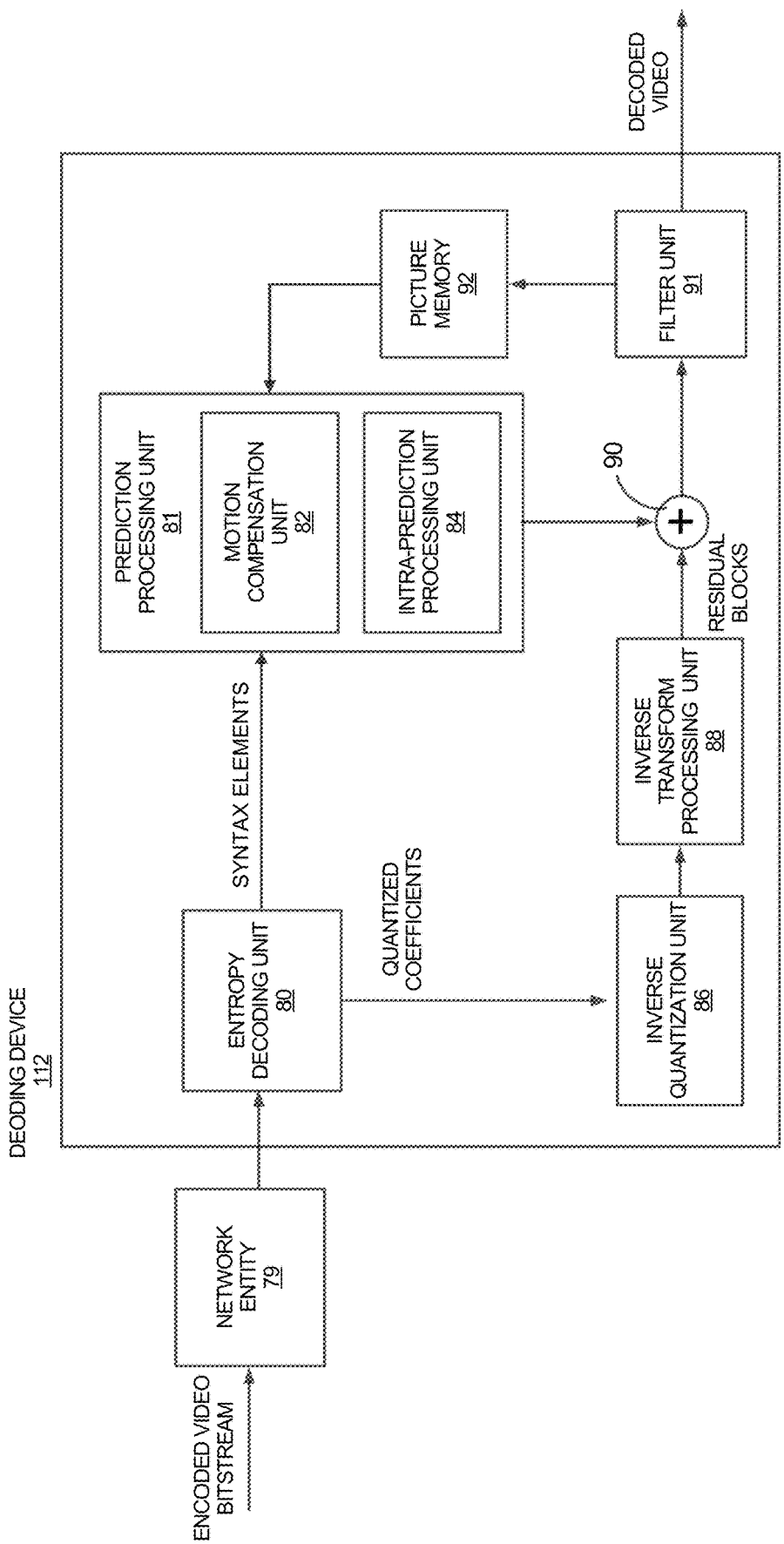
FIG. 12 is a block diagram illustrating an example video decoding device, in accordance with some examples.

Specific details of the encoding device 104 and the decoding device 112 are shown in FIG. 11 and FIG. 12, respectively. FIG. 11 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (1 mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 11 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 11, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The ncoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 1 represents an example of a video encoder configured to perform any of the techniques described herein, including the processes described above with respect to FIG. 9 and/or FIG. 10. In some cases, some of the techniques of this disclosure may also be implemented by post processing device 57.

FIG. 12 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 12.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS. SPS, and PPS.

When the video slice is coded as an intra-coded (1) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

Alter motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 12 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 12 represents an example of a video decoder configured to perform any of the techniques described herein, including the processes described above with respect to FIG. 9 and/or FIG. 10.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), lash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Example 1

A method of decoding video data. The method includes: obtaining an encoded video bitstream including video data; determining motion information associated with a block of the video data, the motion information comprising at least a motion vector and an illumination compensation flag; comparing the motion information with stored motion information in a motion information candidate list, the stored motion information comprising a stored motion vector and a stored illumination compensation flag; determining that the motion vector matches the stored motion vector; and determining whether to update the stored illumination compensation flag based on a value of the illumination compensation flag and a value of the stored illumination compensation flag.

Example 2

A method according to Example 1, further comprising: updating the stored illumination flag to a first value if the value of the illumination compensation flag is the first value and the value of the stored illumination compensation flag is a second value.

Example 3

A method according to any of Examples 1 or 2, wherein the first value is a true value and the second value is a false value.

Example 4

A method according to any of Examples 1 to 2, wherein the first value is a false value and the second value is a true value.

Example 5

A method according to any of Examples 1 to 4, wherein the stored illumination flag is not updated if the value of the illumination compensation flag is a first value and the value of the stored illumination compensation flag is the first value.

Example 6

A method according to Example 5, wherein the first value is a true value.

Example 7

A method according to Example 5, wherein the first value is a false value.

Example 8

A method according to any of Examples 1 to 7, further comprising determining whether to apply illumination compensation for the block based on the value of the stored illumination compensation flag, wherein illumination compensation is to be applied if the value of the stored illumination compensation flag is a true value and illumination compensation is not to be applied if the value of the stored illumination compensation flag is a false value.

Example 9

A method according to any of Examples 1 to 8, wherein applying illumination compensation for the block comprises: deriving one or more illumination compensation parameters for the block using one or more neighboring blocks of block and one or more neighboring blocks of a reference block used for inter-prediction of the block.

Example 10

A method according to any of Examples 1 to 9, wherein the one or more neighboring blocks of the block include one or more of a top neighboring block or a left neighboring block of the block, and wherein the one or more neighboring blocks of the reference block include one or more of a top neighboring block or a left neighboring block of the reference block.

Example 11

A method according to any of Examples 1 to 10, further comprising: applying illumination compensation for the block based on the value of the stored illumination compensation flag being a true value; and reconstructing a sample of the block based on the illumination compensation applied to the block.

Example 12

A method according to any of Examples 1 to 11, wherein reconstructing the sample of the block further comprises applying a residual value.

Example 13

An apparatus for decoding video data, the apparatus comprising: a memory; and a processor implemented in circuitry and configured to: obtain an encoded video bitstream including video data; determine motion information associated with a block of the video data, the motion information comprising at least a motion vector and an illumination compensation flag; compare the motion information with stored motion information in a motion information candidate list, the stored motion information comprising a stored motion vector and a stored illumination compensation flag; determine that the motion vector matches the stored motion vector; and determine whether to update the stored illumination compensation flag based on a value of the illumination compensation flag and a value of the stored illumination compensation flag.

Example 14

An apparatus according to Example 13, wherein the processor is further configured to: update the stored illumination flag to a first value if the value of the illumination compensation flag is the first value and the value of the stored illumination compensation flag is a second value.

Example 15

An apparatus according to any of Examples 13 to 14, wherein the first value is a true value and the second value is a false value, or the first value is a false value and the second value is a true value.

Example 16

An apparatus according to any of Examples 13 to 15, wherein the stored illumination flag is not updated if the value of the illumination compensation flag is a first value and the value of the stored illumination compensation flag is the first value.

Example 17

An apparatus according to any of Examples 13 to 16, wherein the first value is a true value or the first value is a false value.

Example 18

An apparatus according to any of Examples 13 to 17, wherein the processor is further configured to: determine whether to apply illumination compensation for the block based on the value of the stored illumination compensation flag, wherein illumination compensation is to be applied if the value of the stored illumination compensation flag is a true value and illumination compensation is not to be applied if the value of the stored illumination compensation flag is a false value.

Example 19

An apparatus according to any of Examples 13 to 18, wherein applying illumination compensation for the block comprises: deriving one or more illumination compensation parameters for the block using one or more neighboring blocks of block and one or more neighboring blocks of a reference block used for inter-prediction of the block.

Example 20

An apparatus according to any of Examples 13 to 19, wherein the one or more neighboring blocks of the block include one or more of a top neighboring block or a left neighboring block of the block, and wherein the one or more neighboring blocks of the reference block include one or more of a top neighboring block or a left neighboring block of the reference block.

Example 21

An apparatus according to any of Examples 13 to 20, wherein the processor is further configured to: apply illumination compensation for the block based on the value of the stored illumination compensation flag being a true value; and reconstruct a sample of the block based on the illumination compensation applied to the block.

Example 22

An apparatus according to any of Examples 13 to 21, wherein reconstructing the sample of the block further comprises applying a residual value.

Example 23

An apparatus according to any of Examples 13 to 22, wherein the apparatus comprises a mobile device with a camera for capturing one or more pictures.

Example 24

An apparatus according to any of Examples 13 to 23, further comprising a display for displaying one or more pictures.

Example 25

A non-transitory computer-readable medium having stored thereon instructions that, when executed by one or more processors, cause the one or more processors to perform any of the methods according to any of the examples 1 to 12. For example, the non-transitory computer-readable medium can have stored thereon instructions that, when executed by one or more processors, cause the one or more processors to: obtain an encoded video bitstream including video data; determine motion information associated with a block of the video data, the motion information comprising at least a motion vector and an illumination compensation flag; compare the motion information with stored motion information in a motion information candidate list, the stored motion information comprising a stored motion vector and a stored illumination compensation flag;

determine that the motion vector matches the stored motion vector; and determine whether to update the stored illumination compensation flag based on a value of the illumination compensation flag and a value of the stored illumination compensation flag.

Example 26

An apparatus for decoding video data using the methods according to any of the examples 1 to 12. For example, the apparatus can include: means for obtaining an encoded video bitstream including video data; means for determining motion information associated with a block of the video data, the motion information comprising at least a motion vector and an illumination compensation flag; means for comparing the motion information with stored motion information in a motion information candidate list, the stored motion information comprising a stored motion vector and a stored illumination compensation flag; means for determining that the motion vector matches the stored motion vector; and means for determining whether to update the stored illumination compensation flag based on a value of the illumination compensation flag and a value of the stored illumination compensation flag.

Example 27

A method of encoding video data, comprising: obtaining a block of a picture of video data; determining motion information associated with the block of the video data, the motion information comprising at least a motion vector and an illumination compensation flag; comparing the motion information with a stored motion information in a motion information candidate list, the stored motion information comprising a stored motion vector and a stored illumination compensation flag; determining that the motion vector matches the stored motion vector; determining whether to update the stored illumination compensation flag based on a value of the illumination compensation flag and a value of the stored illumination compensation flag; and generating an encoded video bitstream including at least the stored motion information.

Example 28

A method of Example 27, wherein the processor is further configured to: update the stored illumination flag to a first value if the value of the illumination compensation flag is the first value and the value of the stored illumination compensation flag is a second value.

Example 29

A method of any of Examples 27 to 28, wherein the processor is further configured to: determine a prediction value for the stored illumination compensation flag; compare the prediction value with the value of the illumination compensation flag; generate a comparison flag based on the comparison, wherein the comparison flag is set to a first value if prediction value matches the value of the illumination compensation flag or a second value if prediction value does not match the value of the illumination compensation flag; and generate the encoded video bitstream based on the comparison flag.

Example 30

A method of any of Examples 27 to 29, wherein generating the encoded video bitstream based on the comparison flag comprises applying a compression algorithm on the comparison flag.

Example 31

A method of any of Examples 27 to 30, wherein the prediction value for the stored illumination compensation flag is based on one or more illumination compensation flags associated with corresponding one or more neighboring blocks of the block.

Example 32

An apparatus comprising a memory configured to store video data and a processor configured to process the video data according to any of the Examples 26 to 31

Example 33

An apparatus according to Example 32, wherein the apparatus includes a decoder.

Example 34

An apparatus according to any of Examples 32 to 33, wherein the apparatus includes an encoder.

Example 35

An apparatus according to any of Examples 32 to 34, wherein the apparatus is a mobile device.

Example 36

An apparatus according to any of Examples 32 to 35, wherein the apparatus includes a display configured to display the video data.

Example 37

An apparatus according to any of Examples 32 to 36, wherein the apparatus includes a camera configured to capture one or more pictures.

Example 38

A computer readable medium having stored thereon instructions that when executed by a processor perform the methods of any of examples 26 to 31.

Clause 1: A method of processing video data, the method comprising: obtaining the video data and motion information associated with a block of the video data, the motion information including at least a first motion information candidate and a second motion information candidate; adding the first motion information candidate to a candidate list; determining a second value of a second illumination compensation flag of the second motion information candidate is different than a first value of a first illumination compensation flag of the first motion information candidate; and updating, in the candidate list, the first illumination compensation flag from the first value to the second value.

Clause 2: A method of Clause 1, wherein the second motion information candidate is not added to the candidate list.

Clause 3: A method of any one of Clauses 1 to 2, wherein the first value of the first illumination compensation flag is equal to false, a value of false indicating illumination compensation is not applicable to the block, and wherein the second value of the second illumination compensation flag is equal to true, a value of true indicating illumination compensation is applicable to the block.

Clause 4: A method of any one of Clauses 1 to 3, wherein the first motion information candidate includes a first motion vector, a first index, and the first illumination compensation flag, and wherein the second motion information candidate includes a second motion vector, a second index, and the second illumination compensation flag.

Clause 5: A method of Clause 4, wherein the first motion vector is equal to the second motion vector, and wherein the first index is equal to the second index.

Clause 6: A method of any one of Clauses 1 to 5, further comprising performing illumination compensation for the block, wherein performing the illumination compensation includes: deriving one or more illumination compensation parameters for the block; and applying the one or more illumination compensation parameters to the block.

Clause 7: A method of Clause 6, wherein the one or more illumination compensation parameters for the block are derived using neighboring reconstructed samples.

Clause 8: A method of Clause 7, wherein the neighboring reconstructed samples are from one or more of a first neighboring block of the block and a second neighboring block of a reference block used for inter-prediction.

Clause 9: A method of Clause 8, wherein the first neighboring block includes one or more of a top neighboring block or a left neighboring block of the block, and wherein the second neighboring block includes one or more of a top neighboring block or a left neighboring block of the reference block.

Clause 10: A method of any one of Clauses 8 to 9, wherein deriving the one or more illumination compensation parameters for the block includes minimizing a difference between reconstructed samples of the first neighboring block and reconstructed samples of the second neighboring block.

Clause 11: A method of any one of Clauses 6 to 10, wherein the one or more illumination compensation parameters include the first illumination compensation flag, at least one scaling factor, and at least one offset.

Clause 12: A method of any of Clauses 6 to 11, wherein performing the illumination compensation on the block results in an illumination compensated predictor, and further comprising decoding the block using the illumination compensated predictor.

Clause 13: A method of any of Clauses 6 to 12, further comprising signaling the one or more illumination compensation parameters in an encoded video bitstream.

Clause 14: A method of any of Clauses 1 to 12, further comprising signaling the first illumination compensation flag in an encoded video bitstream.

Clause 15: An apparatus comprising a memory configured to store video data and a processor configured to process the video data according to any of Clauses 1 to 14.

Clause 16: An apparatus of Clause 15, wherein the apparatus includes a decoder.

Clause 17: An apparatus of Clause 15, wherein the apparatus includes an encoder.

Clause 18: An apparatus of any one of Clauses 15 to 17, wherein the apparatus is a mobile device.

Clause 19: An apparatus of any one of Clauses 15 to 18, wherein the apparatus includes a display configured to display the video data.

Clause 20: An apparatus of any one of Clauses 15 to 19, wherein the apparatus includes a camera configured to capture one or more pictures.

Clause 21: A computer readable medium having stored thereon instructions that when executed by a processor perform the methods of any of Clauses 1 to 14.

Clause 22: A method of processing video data, the method comprising: obtaining the video data obtaining a candidate list associated with a block of the video data, the candidate list comprising motion information including at least a first motion information candidate, wherein a first value of a first illumination compensation flag of the first motion information candidate includes a second value of a second illumination compensation flag of a second motion information candidate based on the second value being different than a previous value of the first illumination compensation flag; and processing the block of the video data using the motion information of the candidate list.

Clause 23: A method of Clause 22, wherein the candidate list does not include the second motion information candidate.

Clause 24: A method of any one of Clauses 22 to 23, wherein the previous value of the first illumination compensation flag is equal to false, a value of false indicating illumination compensation is not applicable to the block, and wherein the second value of the second illumination compensation flag is equal to true, a value of true indicating illumination compensation is applicable to the block.

Clause 25: A method of any one of Clauses 22 to 24, wherein the first motion information candidate includes a first motion vector, a first index, and the first illumination compensation flag, and wherein the second motion information candidate includes a second motion vector, a second index, and the second illumination compensation flag.

Clause 26: A method of Clause 25, wherein the first motion vector is equal to the second motion vector, and wherein the first index is equal to the second index.

Clause 27: A method of any one of Clauses 22 to 26, further comprising performing illumination compensation for the block, wherein performing the illumination compensation includes: deriving one or more illumination compensation parameters for the block; and applying the one or more illumination compensation parameters to the block.

Clause 28: A method of Clause 27, wherein the one or more illumination compensation parameters for the block are derived using neighboring reconstructed samples.

Clause 29: A method of Clause 28, wherein the neighboring reconstructed samples are from one or more of a first neighboring block of the block and a second neighboring block of a reference block used for inter-prediction.

Clause 30: A method of Clause 29, wherein the first neighboring block includes one or more of a top neighboring block or a left neighboring block of the block, and wherein the second neighboring block includes one or more of a top neighboring block or a left neighboring block of the reference block.

Clause 31: A method of any one of Clauses 29 to 30, wherein deriving the one or more illumination compensation parameters for the block includes minimizing a difference between reconstructed samples of the first neighboring block and reconstructed samples of the second neighboring block.

Clause 32: A method of any one of Clauses 27 to 31, wherein the one or more illumination compensation parameters include the first illumination compensation flag, at least one scaling factor, and at least one offset.

Clause 33: A method of any of Clauses 27 to 32, wherein performing the illumination compensation on the block results in an illumination compensated predictor, and further comprising decoding the block using the illumination compensated predictor.

Clause 34: A method of any of Clauses 27 to 33, further comprising signaling the one or more illumination compensation parameters in an encoded video bitstream.

Clause 35: A method of any of Clauses 22 to 33, further comprising signaling the first illumination compensation flag in an encoded video bitstream.

Clause 36: An apparatus comprising a memory configured to store video data and a processor configured to process the video data according to any of Clauses 22 to 35.

Clause 37: An apparatus of Clause 36, wherein the apparatus includes a decoder.

Clause 38: An apparatus of Clause 36, wherein the apparatus includes an encoder.

Clause 39: An apparatus of any one of Clauses 36 to 38, wherein the apparatus is a mobile device.

Clause 40: An apparatus of any one of Clauses 36 to 39, wherein the apparatus includes a display configured to display the video data.

Clause 41: An apparatus of any one of Clauses 36 to 40, wherein the apparatus includes a camera configured to capture one or more pictures.

Clause 42: A computer readable medium having stored thereon instructions that when executed by a processor perform the methods of any of Clauses 22 to 35.

Clause 43: A method of processing video data, the method comprising: obtaining the video data, the video data including at least a block of video data; determining an illumination compensation flag predictor for the block of video data, the illumination compensation flag predictor indicating whether illumination compensation applies to the block of video data; and determining a value of a flag associated with the illumination compensation flag predictor, the value being determined based on a comparison of the illumination compensation flag predictor with an illumination compensation flag associated with the block of video data.

Clause 44: A method of Clause 43, wherein the illumination compensation flag predictor is determined for the block of video data based on one or more illumination compensation flags of one or more neighboring blocks of the block.

Clause 45: A method of Clause 44, wherein determining the illumination compensation flag predictor for the block of video data includes: determining at least one of the one or more neighboring blocks has an illumination compensation flag equal to a first value; and setting a value of the illumination compensation flag predictor to the first value based on the at least one of the one or more neighboring blocks having an illumination compensation flag equal to the first value.

Clause 46: A method of Clause 44, wherein determining the illumination compensation flag predictor for the block of video data includes: determining a number of the one or more neighboring blocks that have an illumination compensation flag equal to a first value; determining the number is greater than a threshold number; and setting a value of the illumination compensation flag predictor to the first value based on the number being greater than the threshold number.

Clause 47: A method of Clause 43, wherein the illumination compensation flag predictor is determined for the block of video data based on a motion information candidate.

Clause 48: A method of Clause 47, wherein determining the illumination compensation flag predictor for the block of video data includes: determining a value of an illumination compensation flag included in the motion information candidate; and setting a value of the illumination compensation flag predictor to the value of the illumination compensation flag.

Clause 49: A method of any one of Clauses 43 to 48, wherein determining the value of the flag associated with the illumination compensation flag predictor includes: comparing a value of the illumination compensation flag predictor to a value of the illumination compensation flag associated with the block of video data; determining whether the value of the illumination compensation flag predictor is equal to the value of the illumination compensation flag associated with the block of video data; and setting the value of the flag associated with the illumination compensation flag predictor based on whether the illumination compensation flag predictor is equal to the value of the illumination compensation flag associated with the block of video data.

Clause 50: A method of Clause 49, wherein the value of the flag associated with the illumination compensation flag predictor is set to a first value when the value of the illumination compensation flag predictor is equal to the value of the illumination compensation flag associated with the block of video data, and wherein the value of the flag associated with the illumination compensation flag predictor is set to a second value when the value of the illumination compensation flag predictor is not equal to the value of the illumination compensation flag associated with the block of video data.

Clause 51: A method of any one of Clauses 43 to 50, further comprising performing illumination compensation for the block, wherein performing the illumination compensation includes: deriving one or more illumination compensation parameters for the block; and applying the one or more illumination compensation parameters to the block.

Clause 52: A method of Clause 51, wherein the one or more illumination compensation parameters for the block are derived using neighboring reconstructed samples.

Clause 53: A method of Clause 52, wherein the neighboring reconstructed samples are from one or more of a first neighboring block of the block and a second neighboring block of a reference block used for inter-prediction.

Clause 54: A method of Clause 53, wherein the first neighboring block includes one or more of a top neighboring block or a left neighboring block of the block, and wherein the second neighboring block includes one or more of a top neighboring block or a left neighboring block of the reference block.

Clause 55: A method of any one of Clauses 48 to 54, wherein deriving the one or more illumination compensation parameters for the block includes minimizing a difference between reconstructed samples of the first neighboring block and reconstructed samples of the second neighboring block.

Clause 56: A method of any one of Clauses 46 to 55, wherein the one or more illumination compensation parameters include at least one scaling factor and at least one offset.

Clause 57: A method of any of Clauses 46 to 56, wherein performing the illumination compensation on the block results in an illumination compensated predictor, and further comprising decoding the block using the illumination compensated predictor.

Clause 58: A method of any of Clauses 46 to 57, further comprising signaling the one or more illumination compensation parameters in an encoded video bitstream.

Clause 59: A method of any of Clauses 43 to 57, further comprising signaling the flag associated with the illumination compensation flag predictor in an encoded video bitstream.

Clause 60: An apparatus comprising a memory configured to store video data and a processor configured to process the video data according to any of Clauses 43 to 59.

Clause 61: An apparatus of Clause 60, wherein the apparatus includes a decoder.

Clause 62: An apparatus of Clause 60, wherein the apparatus includes an encoder.

Clause 63: An apparatus of any one of Clauses 60 to 62, wherein the apparatus is a mobile device.

Clause 64: An apparatus of any one of Clauses 60 to 63, wherein the apparatus includes a display configured to display the video data.

Clause 65: An apparatus of any one of Clauses 60 to 64, wherein the apparatus includes a camera configured to capture one or more pictures.

Clause 66: A computer readable medium having stored thereon instructions that when executed by a processor perform the methods of any of Clauses 43 to 59.

Clause 67: A method of processing video data, the method comprising: obtaining the video data, the video data including at least a block of video data; obtaining an illumination compensation flag associated with the block of video data; and applying context coding to the illumination compensation flag.

Clause 68: A method of Clause 67, wherein the context coding applied to the illumination compensation flag is based on one or more illumination compensation flags of one or more neighboring blocks of the block.

Clause 69: A method of Clause 68, wherein applying the context coding to the illumination compensation flag includes: determining at least one of the one or more neighboring blocks has an illumination compensation flag equal to a first value; and assigning a first context to the illumination compensation flag based on the at least one of the one or more neighboring blocks having an illumination compensation flag equal to the first value.

Clause 70: A method of Clause 68, wherein applying the context coding to the illumination compensation flag includes: determining none of the one or more neighboring blocks has an illumination compensation flag equal to a first value; and assigning a second context to the illumination compensation flag based on none of the one of the one or more neighboring blocks having an illumination compensation flag equal to the first value.

Clause 71: A method of Clause 68, wherein applying the context coding to the illumination compensation flag includes: determining a number of the one or more neighboring blocks that have an illumination compensation flag equal to a first value; determining the number is greater than a threshold number; and assigning a first context to the illumination compensation flag based on the number being greater than the threshold number.

Clause 72: A method of Clause 68, wherein applying the context coding to the illumination compensation flag includes: determining a number of the one or more neighboring blocks that have an illumination compensation flag equal to a first value; determining the number is less than a threshold number; and assigning a second context to the illumination compensation flag based on the number being less than the threshold number.

Clause 73: A method of Clause 67, wherein the context coding applied to the illumination compensation flag is based on a size of the block.

Clause 74: A method of Clause 73, wherein the size of the block is based on one or more of a width or a height of the block.

Clause 75: A method of any one of Clauses 73 to 74, wherein the size of the block is based on an area of the block.

Clause 76: A method of any one of Clauses 73 to 75, wherein applying the context coding to the illumination compensation flag includes: determining the size of the block is less than a threshold size; and applying a first context to the illumination compensation flag based on the size of the block being less than the threshold size.

Clause 77: A method of any one of Clauses 73 to 75, wherein applying the context coding to the illumination compensation flag includes: determining the size of the block is greater than a threshold size; and applying a second context to the illumination compensation flag based on the size of the block being greater than the threshold size.

Clause 78: A method of any one of Clauses 67 to 77, further comprising performing illumination compensation for the block, wherein performing the illumination compensation includes: deriving one or more illumination compensation parameters for the block; and applying the one or more illumination compensation parameters to the block.

Clause 79: A method of Clause 78, wherein the one or more illumination compensation parameters for the block are derived using neighboring reconstructed samples.

Clause 80: A method of Clause 79, wherein the neighboring reconstructed samples are from one or more of a first neighboring block of the block and a second neighboring block of a reference block used for inter-prediction.

Clause 81: A method of Clause 80, wherein the first neighboring block includes one or more of a top neighboring block or a left neighboring block of the block, and wherein the second neighboring block includes one or more of a top neighboring block or a left neighboring block of the reference block.

Clause 82: A method of any one of Clauses 48 to 81, wherein deriving the one or more illumination compensation parameters for the block includes minimizing a difference between reconstructed samples of the first neighboring block and reconstructed samples of the second neighboring block.

Clause 83: A method of any one of Clauses 46 to 82, wherein the one or more illumination compensation parameters include at least one scaling factor and at least one offset.

Clause 84: A method of any of Clauses 46 to 83, wherein performing the illumination compensation on the block results in an illumination compensated predictor, and further comprising decoding the block using the illumination compensated predictor.

Clause 85: A method of any of Clauses 46 to 84, further comprising signaling the one or more illumination compensation parameters in an encoded video bitstream.

Clause 86: A method of any of Clauses 67 to 84, further comprising signaling the context coded illumination compensation flag in an encoded video bitstream.

Clause 87: An apparatus comprising a memory configured to store video data and a processor configured to process the video data according to any of Clauses 67 to 86.

Clause 88: An apparatus of Clause 87, wherein the apparatus includes a decoder.

Clause 89: An apparatus of Clause 87, wherein the apparatus includes an encoder.

Clause 90: An apparatus of any one of Clauses 87 to 89, wherein the apparatus is a mobile device.

Clause 91: An apparatus of any one of Clauses 87 to 90, wherein the apparatus includes a display configured to display the video data.

Clause 92: An apparatus of any one of Clauses 87 to 91, wherein the apparatus includes a camera configured to capture one or more pictures.

Clause 93: A computer readable medium having stored thereon instructions that when executed by a processor perform the methods of any of Clauses 67 to 86.

What is claimed is:

1. A method of decoding video data, the method comprising:
    obtaining an encoded video bitstream including video data;
    determining motion information associated with a block of the video data, the motion information comprising at least a motion vector and an illumination compensation flag;
    comparing the motion information with stored motion information in a motion information candidate list, the stored motion information comprising a stored motion vector and a stored illumination compensation flag;
    determining that the motion vector matches the stored motion vector; and
    determining whether to update the stored illumination compensation flag based on a value of the illumination compensation flag and a value of the stored illumination compensation flag.

2. The method of claim 1, further comprising:
    updating the stored illumination flag to a first value if the value of the illumination compensation flag is the first value and the value of the stored illumination compensation flag is a second value.

3. The method of claim 2, wherein the first value is a true value and the second value is a false value.

4. The method of claim 2, wherein the first value is a false value and the second value is a true value.

5. The method of claim 1, wherein the stored illumination flag is not updated if the value of the illumination compensation flag is a first value and the value of the stored illumination compensation flag is the first value.

6. The method of claim 5, wherein the first value is a true value.

7. The method of claim 5, wherein the first value is a false value.

8. The method of claim 1, further comprising:
    determining whether to apply illumination compensation for the block based on the value of the stored illumination compensation flag, wherein illumination compensation is to be applied if the value of the stored illumination compensation flag is a true value and illumination compensation is not to be applied if the value of the stored illumination compensation flag is a false value.

9. The method of claim 8, wherein applying illumination compensation for the block comprises:
    deriving one or more illumination compensation parameters for the block using one or more neighboring blocks of block and one or more neighboring blocks of a reference block used for inter-prediction of the block.

10. The method of claim 9, wherein the one or more neighboring blocks of the block include one or more of a top neighboring block or a left neighboring block of the block, and wherein the one or more neighboring blocks of the reference block include one or more of a top neighboring block or a left neighboring block of the reference block.

11. The method of claim 8, further comprising:
    applying illumination compensation for the block based on the value of the stored illumination compensation flag being a true value; and
    reconstructing a sample of the block based on the illumination compensation applied to the block.

12. The method of claim 11, wherein reconstructing the sample of the block further comprises applying a residual value.

13. An apparatus for decoding video data, the apparatus comprising:
    a memory; and
    a processor implemented in circuitry and configured to:
        obtain an encoded video bitstream including video data;
        determine motion information associated with a block of the video data, the motion information comprising at least a motion vector and an illumination compensation flag;
        compare the motion information with stored motion information in a motion information candidate list, the stored motion information comprising a stored motion vector and a stored illumination compensation flag;
        determine that the motion vector matches the stored motion vector; and
        determine whether to update the stored illumination compensation flag based on a value of the illumination compensation flag and a value of the stored illumination compensation flag.

14. The apparatus of claim 13, wherein the processor is further configured to:
    update the stored illumination flag to a first value if the value of the illumination compensation flag is the first value and the value of the stored illumination compensation flag is a second value.

15. The apparatus of claim 14, wherein the first value is a true value and the second value is a false value, or the first value is a false value and the second value is a true value.

16. The apparatus of claim 13, wherein the stored illumination flag is not updated if the value of the illumination compensation flag is a first value and the value of the stored illumination compensation flag is the first value.

17. The apparatus of claim 16, wherein the first value is a true value or the first value is a false value.

18. The apparatus of claim 13, wherein the processor is further configured to:
    determine whether to apply illumination compensation for the block based on the value of the stored illumination compensation flag, wherein illumination compensation is to be applied if the value of the stored illumination compensation flag is a true value and illumination compensation is not to be applied if the value of the stored illumination compensation flag is a false value.

19. The apparatus of claim 18, wherein applying illumination compensation for the block comprises:
    deriving one or more illumination compensation parameters for the block using one or more neighboring blocks of block and one or more neighboring blocks of a reference block used for inter-prediction of the block.

20. The apparatus of claim 19, wherein the one or more neighboring blocks of the block include one or more of a top neighboring block or a left neighboring block of the block, and wherein the one or more neighboring blocks of the reference block include one or more of a top neighboring block or a left neighboring block of the reference block.

21. The apparatus of claim 18, wherein the processor is further configured to:
apply illumination compensation for the block based on the value of the stored illumination compensation flag being a true value; and
reconstruct a sample of the block based on the illumination compensation applied to the block.

22. The apparatus of claim 21, wherein reconstructing the sample of the block further comprises applying a residual value.

23. The apparatus of claim 13, wherein the apparatus comprises a mobile device with a camera for capturing one or more pictures.

24. The apparatus of claim 13, further comprising a display for displaying one or more pictures.

25. A non-transitory computer-readable medium having stored thereon instructions that, when executed by one or more processors, cause the one or more processors to:
obtain an encoded video bitstream including video data;
determine motion information associated with a block of the video data, the motion information comprising at least a motion vector and an illumination compensation flag;
compare the motion information with stored motion information in a motion information candidate list, the stored motion information comprising a stored motion vector and a stored illumination compensation flag;
determine that the motion vector matches the stored motion vector; and
determine whether to update the stored illumination compensation flag based on a value of the illumination compensation flag and a value of the stored illumination compensation flag.

26. An apparatus for encoding video data, the apparatus comprising:
a memory; and
a processor implemented in circuitry and configured to:
obtain a block of a picture of video data;
determine motion information associated with the block of the video data, the motion information comprising at least a motion vector and an illumination compensation flag;
compare the motion information with a stored motion information in a motion information candidate list, the stored motion information comprising a stored motion vector and a stored illumination compensation flag;
determine that the motion vector matches the stored motion vector;
determine whether to update the stored illumination compensation flag based on a value of the illumination compensation flag and a value of the stored illumination compensation flag; and
generate an encoded video bitstream including at least the stored motion information.

27. The apparatus of claim 26, wherein the processor is further configured to:
update the stored illumination flag to a first value if the value of the illumination compensation flag is the first value and the value of the stored illumination compensation flag is a second value.

28. The apparatus of claim 26, wherein the processor is further configured to:
determine a prediction value for the stored illumination compensation flag;
compare the prediction value with the value of the illumination compensation flag;
generate a comparison flag based on the comparison, wherein the comparison flag is set to a first value if prediction value matches the value of the illumination compensation flag or a second value if prediction value does not match the value of the illumination compensation flag; and
generate the encoded video bitstream based on the comparison flag.

29. The apparatus of claim 28, wherein generating the encoded video bitstream based on the comparison flag comprises applying a compression algorithm on the comparison flag.

30. The apparatus of claim 28, wherein the prediction value for the stored illumination compensation flag is based on one or more illumination compensation flags associated with corresponding one or more neighboring blocks of the block.

* * * * *